(12) United States Patent
Varsanyi

(10) Patent No.: US 9,525,642 B2
(45) Date of Patent: Dec. 20, 2016

(54) ORDERING TRAFFIC CAPTURED ON A DATA CONNECTION

(71) Applicant: DB Networks, Inc., Poway, CA (US)

(72) Inventor: Eric Varsanyi, Plymouth, MN (US)

(73) Assignee: DB NETWORKS, INC., Carlsbad, CA (US)

( * ) Notice: Subject to any disclaimer, the term of this patent is extended or adjusted under 35 U.S.C. 154(b) by 265 days.

(21) Appl. No.: 14/560,295

(22) Filed: Dec. 4, 2014

(65) Prior Publication Data

US 2015/0156130 A1 Jun. 4, 2015

Related U.S. Application Data

(60) Provisional application No. 61/911,970, filed on Dec. 4, 2013.

(51) Int. Cl.
*H04L 12/56* (2006.01)
*H04L 12/823* (2013.01)

(52) U.S. Cl.
CPC .................. *H04L 47/323* (2013.01)

(58) Field of Classification Search
CPC .................................... H04L 45/745
USPC .................. 370/401, 389, 428, 411
See application file for complete search history.

(56) References Cited

U.S. PATENT DOCUMENTS

| | | | |
|---|---|---|---|
| 5,768,578 A | 6/1998 | Kirk et al. | |
| 7,154,855 B2 | 12/2006 | Hardy | |
| 7,522,605 B2 | 4/2009 | Spencer et al. | |
| 7,782,790 B1 | 8/2010 | Nadeau et al. | |
| 8,180,916 B1 | 5/2012 | Nucci et al. | |
| 8,964,548 B1 | 2/2015 | Keralapura et al. | |
| 2001/0001608 A1 | 5/2001 | Parruck et al. | |
| 2003/0055806 A1 | 3/2003 | Wong et al. | |
| 2005/0091532 A1 | 4/2005 | Moghe | |

(Continued)

FOREIGN PATENT DOCUMENTS

| | | |
|---|---|---|
| JP | 2007151013 A | 6/2007 |
| WO | 2005/109754 A1 | 11/2005 |

OTHER PUBLICATIONS

International Search Report and Written Opinion for PCT/US2014/010908, mailed on Jun. 13, 2014, in 12 pages.

(Continued)

*Primary Examiner* — Dang Ton
(74) *Attorney, Agent, or Firm* — Procopio, Cory, Hargreaves & Savitch LLP; Jonathan D. Cheng

(57) ABSTRACT

Ordering partial network traffic. In an embodiment, data packets are received from a network tap and separated into two queues. For each queue, a push-sequence is maintained to represent a sequence number that must be pushed in order to maintain a consecutive order. When both push-sequences are equal to the sequence number of their first packets, if the acknowledgement number of the first packet on one queue is greater than the push-sequence for the other queue and less than or equal to the push-sequence of the one queue, data is pushed off the other queue. Otherwise, a queue having the earlier timestamp is identified as a first queue, the existence of a next acknowledgement number is determined for the second (other) queue, and data is pushed off the first queue according to the existence of the next acknowledgement number. Gap packets may be generated to force progress.

20 Claims, 17 Drawing Sheets

(56) References Cited

U.S. PATENT DOCUMENTS

| | | |
|---|---|---|
| 2005/0097209 A1 | 5/2005 | McDonagh et al. |
| 2005/0149557 A1 | 7/2005 | Moriya et al. |
| 2006/0212942 A1 | 9/2006 | Barford et al. |
| 2007/0118665 A1 | 5/2007 | Philbrick et al. |
| 2008/0091405 A1 | 4/2008 | Anisimovich et al. |
| 2009/0049547 A1 | 2/2009 | Fan |
| 2010/0020708 A1 | 1/2010 | Okada et al. |
| 2011/0082688 A1 | 4/2011 | Kim et al. |
| 2011/0252152 A1 | 10/2011 | Sherry et al. |
| 2011/0258610 A1 | 10/2011 | Aaraj et al. |
| 2012/0096553 A1 | 4/2012 | Srivastava et al. |
| 2012/0263182 A1 | 10/2012 | Enomoto et al. |
| 2014/0201838 A1* | 7/2014 | Varsanyi ............ H04L 63/1425 726/23 |
| 2015/0156130 A1* | 6/2015 | Varsanyi ............... H04L 47/323 370/412 |

OTHER PUBLICATIONS

International Search Report and Written Opinion for PCT/US2013/023445, mailed on May 16, 2013, in 11 pages.
Myers. "An O(ND) Difference Algorithm and Its Variations," Algorithmica, Nov. 1986, in 15 pages.
International Search Report and Written Opinion for PCT/US2014/068616, mailed on Feb. 25, 2015, in 6 pages.
Extended European Search Report for related EP Patent Application No. 13743384.3, mailed on Oct. 16, 2015, in 4 pages.
Extended European Search Report for related EP Patent Application No. 14737572.9 mailed on Jul. 20, 2016, in 8 pages.
Mukherjee et al. "Network Intrusion Detection." IEEE Network. 8(3)26-41 (May 1, 1994).

\* cited by examiner

ORDERING TRAFFIC CAPTURED ON A DATA CONNECTION

CROSS-REFERENCE TO RELATED APPLICATIONS

This application claims priority to U.S. Provisional Patent App. No. 61/911,970, filed on Dec. 4, 2013, the entirety of which is hereby incorporated by reference.

This application is related to U.S. patent application Ser. No. 13/750,579, filed on Jan. 25, 2013 and titled "Systems and Methods for Extracting Structured Application Data from a Communications Link," which claims priority to U.S. Provisional Patent App. No. 61/593,075, filed on Jan. 31, 2012, and is further related to U.S. patent application Ser. No. 14/151,597, filed on Jan. 9, 2014 and titled "Systems and Methods for Detecting and Mitigating Threats to a Structured Data Storage System," which claims priority to U.S. Provisional Patent App. No. 61/751,745, filed on Jan. 11, 2013, the entireties of all of which are hereby incorporated herein by reference.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Field of the Invention

The embodiments described herein generally relate to processing traffic captured on a data connection, and more particularly to inferring an order for collected packets of data captured by a tap on a network connection between two endpoints.

Description of the Related Art

Structured database technology has become a critical component in many corporate technology initiatives. With the success of the Internet, the use of database technology has exploded in consumer and business-to-business applications. However, with the popularity of database architectures, risks and challenges have arisen, such as complex and difficult-to-identify performance issues and subtle gaps in security that can allow confidential data to be accessed by unauthorized users.

A large fraction of database applications use a database server which has structured data stored and indexed. Clients access the database server to store, update, and query the structured data. The clients may communicate with the database server using standard networking technology, such as Transmission Control Protocol (TCP), Internet Protocol (IP), Ethernet, and/or the like, using various physical or virtual media, and via one or more intervening servers (e.g., a web server and/or application server).

Below the application and/or database layer, a sequenced byte protocol, such as TCP or Sequenced Packet Exchange (SPX), is generally used to ensure delivery of messages between client and server systems in the face of potentially unreliable lower-level transport mechanisms. These protocols may exchange multiple packets to deliver a single byte of data. The transmission and/or reception of such packets may be asynchronous, such that the order of the packets is not necessarily the same as the order of the byte stream required by the application or database layer. These protocols are designed to work when packets are lost or corrupted between two network agents, such as a client system and server system.

Many network sessions may be established between a server (e.g., database server) and one or more client systems. Generally, each session operates asynchronously with respect to the other sessions, and the data and control information from a plurality of sessions may overlap temporally. In addition, multiple encapsulation technologies and physical layer technologies may be used between a server and its clients.

There are a number of network-tapping technologies that can be used to extract a copy of the packet stream flowing between two or more network agents (also referred to herein as "endpoints" or "hosts"). However, a network tap attempting to observe an exchange will not witness an exact copy of the traffic as seen by either network agent. Rather, the network tap will receive a unique third-party view of the packets, which may comprise a subset or superset of the packets seen by the network agents.

While many uncertainties as to the order of request data may be resolved using data embedded in underlying protocols and transports, these mechanisms are designed to operate at either end of a network conversation (i.e., at the network agents). What is needed is a mechanism that allows such data to be ordered from the third-party perspective of a network tap.

SUMMARY

Accordingly, systems, methods, and media are disclosed for ordering traffic acquired from a network tap which captures traffic on a connection between two network agents.

In an embodiment, a system is disclosed. The system comprises: at least one hardware processor; and one or more software modules that, when executed by the at least one hardware processor, receive a plurality of data packets from a network tap on a network connection between two network agents, wherein each of the plurality of data packets comprise a starting sequence number and an acknowledgement number, separate the plurality of data packets into two queues based on a direction of communication for each data packet, wherein each of the two queues represents a different direction of communication, for each of the two queues, maintain a push-sequence value for the queue, wherein each push-sequence value represents a starting sequence number of a packet that must be pushed off its respective queue next in order to maintain a consecutive sequence number order for packets pushed off its respective queue, when both of the push-sequence values are equal to the starting sequence number of a first data packet on their respective queues, if the acknowledgement number of the first data packet on one of the two queues is greater than the push-sequence value for the other of the two queues and the acknowledgement number of the first data packet on the other queue is less than or equal to the push-sequence value for the one queue, push, to an output, an amount of data off of the other queue that is equal to a minimum of a length of the first data packet on the other queue and a difference between the acknowledgement number of the first data packet on the one queue and the push-sequence value for the other queue, and, otherwise, identify a first one of the two queues whose first data packet has an earlier timestamp than the first data packet on a second one of the two queues, determine whether or not a next acknowledgement number in a data packet exists on the second queue that is greater than a preceding acknowledgement number in a preceding data packet on the second queue, wherein the preceding acknowledgement number is greater than the push-sequence value for the first queue, if the next acknowledgement number is determined to exist on the second queue, push, to the output, an amount of data off of the first queue that is equal to the difference between the next acknowledgement number and the push-sequence value for the first queue, if the next acknowledgement number is not determined to exist on the second queue, push, to the output, the first data packet on the first queue, and provide the output to an application layer, and when at least one of the push-sequence values is not equal to the starting sequence number of the first data packet on its respective queue and a forcing condition is met, generate at least one gap packet for at least one of the two queues.

In a further embodiment, a method is disclosed. The method comprises using at least one hardware processor to: receive a plurality of data packets from a network tap on a network connection between two network agents, wherein each of the plurality of data packets comprise a starting sequence number and an acknowledgement number; separate the plurality of data packets into two queues based on a direction of communication for each data packet, wherein each of the two queues represents a different direction of communication; for each of the two queues, maintain a push-sequence value for the queue, wherein each push-sequence value represents a starting sequence number of a packet that must be pushed off its respective queue next in order to maintain a consecutive sequence number order for packets pushed off its respective queue; when both of the push-sequence values are equal to the starting sequence number of a first data packet on their respective queues, if the acknowledgement number of the first data packet on one of the two queues is greater than the push-sequence value for the other of the two queues and the acknowledgement number of the first data packet on the other queue is less than or equal to the push-sequence value for the one queue, push, to an output, an amount of data off of the other queue that is equal to a minimum of a length of the first data packet on the other queue and a difference between the acknowledgement number of the first data packet on the one queue and the push-sequence value for the other queue, and, otherwise, identify a first one of the two queues whose first data packet has an earlier timestamp than the first data packet on a second one of the two queues, determine whether or not a next acknowledgement number in a data packet exists on the second queue that is greater than a preceding acknowledgement number in a preceding data packet on the second queue, wherein the preceding acknowledgement number is greater than the push-sequence value for the first queue, if the next acknowledgement number is determined to exist on the second queue, push, to the output, an amount of data off of the first queue that is equal to the difference between the next acknowledgement number and the push-sequence value for the first queue, if the next acknowledgement number is not determined to exist on the second queue, push, to the output, the first data packet on the first queue, and provide the output to an application layer; and when at least one of the push-sequence values is not equal to the starting sequence number of the first data packet on its respective queue and a forcing condition is met, generate at least one gap packet for at least one of the two queues.

In a further embodiment, a non-transitory computer-readable medium, having instructions stored therein, is disclosed. The instructions, when executed by a processor, cause the processor to: receive a plurality of data packets from a network tap on a network connection between two network agents, wherein each of the plurality of data packets comprise a starting sequence number and an acknowledgement number; separate the plurality of data packets into two queues based on a direction of communication for each data packet, wherein each of the two queues represents a different direction of communication; for each of the two queues, maintain a push-sequence value for the queue, wherein each push-sequence value represents a starting sequence number of a packet that must be pushed off its respective queue next in order to maintain a consecutive sequence number order for packets pushed off its respective queue; when both of the push-sequence values are equal to the starting sequence number of a first data packet on their respective queues, if the acknowledgement number of the first data packet on one of the two queues is greater than the push-sequence value for the other of the two queues and the acknowledgement number of the first data packet on the other queue is less than or equal to the push-sequence value for the one queue, push, to an output, an amount of data off of the other queue that is equal to a minimum of a length of the first data packet on the other queue and a difference between the acknowledgement number of the first data packet on the one queue and the push-sequence value for the other queue, and, otherwise, identify a first one of the two queues whose first data packet has an earlier timestamp than the first data packet on a second one of the two queues, determine whether or not a next acknowledgement number in a data packet exists on the second queue that is greater than a preceding acknowledgement number in a preceding data packet on the second queue, wherein the preceding acknowledgement number is greater than the push-sequence value for the first queue, if the next acknowledgement number is determined to exist on the second queue, push, to the output, an amount of data off of the first queue that is equal to the difference between the next acknowledgement number and the push-sequence value for the first queue, if the next acknowledgement number is not determined to exist on the second queue, push, to the output, the first data packet on the first queue, and provide the output to an application layer; and when at least one of the push-sequence values is not equal to the starting sequence number of the first data packet on its respective queue and a forcing condition is met, generate at least one gap packet for at least one of the two queues.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
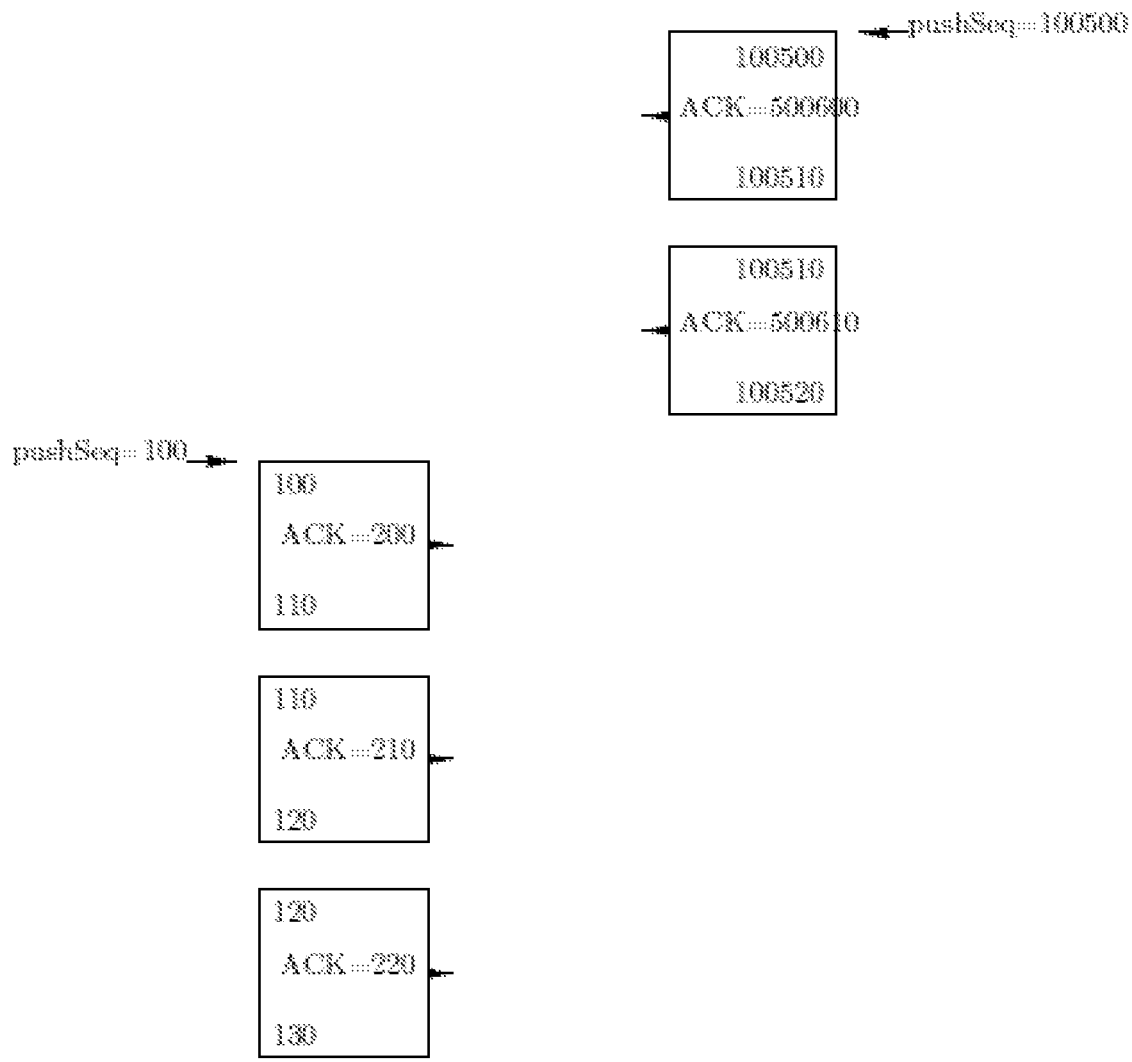
FIG. 1 illustrates a queue state for queues within different universes, according to a non-limiting example described herein.

Systems and methods are disclosed herein for ordering partial network traffic. The network traffic may be captured using the network tap disclosed in U.S. patent application Ser. No. 13/750,579 ("the '579 Application"), ordered as described herein, and provided as input (i.e., "pushed") to the database protocol interpreters and/or semantic traffic model generator disclosed in U.S. patent application Ser. No. 14/151,597 ("the '597 Application"). For example, in an embodiment, the systems and methods for ordering of partial network traffic, disclosed herein, may form part of the capture-and-analysis device disclosed in the '579 Application and/or the traffic reassembly functionality disclosed in the '597 Application, so as to order network traffic received by the network tap in a manner that may be used in the generation of a semantic traffic model.

1. INTRODUCTION

A system, which may implement one or more algorithms (e.g., as software and/or hardware modules), is disclosed herein to properly sort and deliver Transmission Control Protocol (TCP) traffic, which is received as arbitrarily-ordered packets (e.g., in two streams for each side of a connection), for example, as one or more ordered byte streams. The disclosed mechanisms may handle fine and gross ordering problems, unidirectional connections, and/or packet loss.

Since the capture infrastructure (e.g., as discussed in the '579 Application), may reorder packets, the order or fine timing of packets cannot be relied upon. Thus, the system should order the packets based on nothing more than the packets themselves.

At a high level, the task is to take packets as they are received, and sort them into their original order, remove duplicate data, and fill in missing data. The sorted and cleaned queue of traffic may then be provided to upper layers, for example, as a pair of streams.

To describe the design it is easiest to break the problem into smaller parts. Specifically, it is simpler to view the data in each direction of the TCP connection as being on its own sorted queue. Then, the problem is to decide from which queue to draw data at any given time. This problem may be referred to herein as "sync" and is responsible for the bulk of the complexity in the disclosed algorithms when packet loss is present.

In an embodiment, there are two queues, Q0 and Q1. Each queue contains packets received for a given direction of the connection, sorted by sequence number in a micro view and by time in a macro view.

As used herein, the term "pushSeq0" refers to the current "next sequence to push" for the packets on Q0, and the term "pushSeq1" refers to the current "next sequence to push" for packets on Q1.

As used herein, the terms "good queue" and "good packet" refer to the queue or packet, respectively, that contain TCP data in the sequence space referenced by the pushSeq on that queue.

As used herein, the terms "opposite," "opposing queue," and "gap queue" refer to the other queue, which may contain a gap (e.g., missing packets) at its pushSeq.

As used herein, the terms "Q0.pkt" and "Q1.pkt" refer to the first packet on the respective queue.

2. RECEIVE PRE-PROCESSING

In an embodiment, packets are classified into connections, and each TCP connection has a state used for reassembly. The state includes two queues (one for packets observed in each direction) and two pushSeq pointers (one for each of the two queues). The pointers are in TCP sequence space and indicate the next location that is expected by the application layer.

After each packet is received, it may be inserted onto the appropriate queue according to its starting sequence number. For instance, a packet with a sequence space of 110-120 (i.e., a starting sequence number of 110) would be inserted onto a queue after a packet with a sequence space of 100-110 (i.e., a starting sequence number of 100).

Next, a window check is run to possibly adjust connection pushSeq's when the two queues are in two completely different sequence spaces of the connection.

Each queue is then "trimmed." That is, data having a sequence space before the respective pushSeq—duplicate data—is discarded, and trailing acknowledgements (ACK's) are discarded. In some instances, this trimming may split a packet into multiple packets.

After the queues are trimmed, the queues are evaluated in an attempt to push some data off one or more of the queues and to the application.

This process repeats until no more progress can be made (i.e., no packets are retired from either queue).

In an embodiment, packets without a set ACK flag (e.g., represented by an ACK bit) are not used for synchronization. For the purposes of the present description, such a packet is considered part of a subsequent packet that has a set ACK flag. For a normal TCP stack, the synchronization (SYN), and in some cases reset (RST), packets will be missing the ACK bit.

3. CONNECTION WINDOW CHECK

In an embodiment, the system assumes, for normal and gap processing, that the packets at the head of the queues are in the same "universe" with respect to each other. It generally does not make any sense to try to synchronize the two sides of the connection if the ACK's on the other side are not generally pointing at the same area of the available stream.

This assumption may become faulty when there is heavy loss, and the system is only seeing short fragments of a primarily unidirectional connection. For instance, this situation will occur when the system-implemented process steps into the connection after startup, such that the pushSeq's are initialized in different universes. Certain gap-filling cases may also leave the pushSeq's in different universes.

FIG. 1 illustrates separate queues within two, different universes, according to a non-limiting example. The illustrated scenario will occur when the first ACK on either queue is out of window (i.e., a reasonable range of TCP sequence space on either side) with respect to the pushSeq on the other queue. It should be noted that, in all of FIGS. 1-16, Q0 is illustrated as the vertical set of packets on the left side of the figure, and Q1 is shown as the vertical set of packets on the right side of the figure.

To fix the problem of the two queues being in two separate universes, the system chooses one of the two queues to be the current universe. Then, the pushSeq of the other queue is warped to fit the chosen universe. As used herein, "warping" a queue means to reset the queue's pushSeq to a reasonable new value that is not contiguous with the current pushSeq value. In addition, the term "universe" means a connection within a reasonable time frame, such that "two separate universes" may mean two different connections (with each set of packets in its own universe) or the same connection at vastly different times. The algorithm may also notify the application layer that there was an unspecified gap on the connection and that sync was lost.

In an embodiment, the system may implement one or more of the following options to choose which of the two queues for the current universe:

(1) Compare the absolute sequence distance between the pushSeq's and ACKs of the two queues and choose the queue with the least or greatest distance. If the out of window signal is a result of a lot of loss, looking at a larger window (e.g., half the TCP sequence space) to get a greater-than or less-than indication would work. In this case, the system could use the distance between the ACK and the pushSeq and pick the universe of the queue that is less than and closest to the opposing pushSeq. The goal is to pick the universe that is most likely to have newly arriving packets that do not interfere with draining the queues. Thus, as an example, in FIG. 1, the result would be that the pushSeq for Q0 is set to 500600.

(2) Use the earliest packet timestamp. In this case, the system would choose the universe of the queue that has the packet with the earliest timestamp. This option is appealing because the timestamps are more likely to be useful at the macro scale, i.e., beyond the pale of a tapped switch's buffering which may reorder the traffic.

(3) Always use one or the other queue. Choosing a fixed queue is appealing because it can provide more stability if there is wildly vacillating traffic between the two universes (e.g., a random torture test or faulty user driven traffic playback).

The timestamp option (i.e., option (2) above) seems to be the most practical. The logic is:

(1) Choose the queue whose first packet has the lowest timestamp;

(2) Set the opposing queue's pushSeq to the ACK of the first packet on the chosen queue; and (3) Send a connection re-sync message. A connection re-sync message notifies the application layer, which is using the passive TCP stack, that there is a discontinuity. This enables the application layer (e.g., Layer 7 in the Open Systems Interconnection (OSI) model) to take appropriate measures. For instance, the database protocols may finish out any extant pending RPCs at this point, and optionally may close all cursors and knowledge of the database identity and connection parameters ("hoping" to rediscover them again from the subsequent data stream). Thus, the connection re-sync message essentially flushes all cached data about the connection.

In the example illustrated in FIG. 1, since Q1 has the first packet with the earliest timestamp, Q1 would be chosen, and the Q0.pushSeq would be set to 500600. The state would be the "one queue has a gap" case described in Section 5.3.1.2 (Ack=$pushSeq_{gap}$) below. This case will result in the system generating either a small gap packet if there is subsequent traffic to move the process forward, or a large gap packet to bring the pushSeq back up to the existing traffic if there is no subsequent traffic.

The system's management of potential queue states will now be described in detail.

4. BOTH QUEUES READY

4.1. Overview

When there are packets available at pushSeq on both queues, the following cases come into play. If there is a gap on either queue (i.e., no data available at the queue's pushSeq), in an embodiment, forward progress is halted, and the system waits for more packets or a forcing condition, as described elsewhere herein.

There are two goals in the normal push case:

(1) Primary Goal. The first goal of the system is to provide the data in order in each direction. When there are gaps (described elsewhere herein), the system may generate gap packets to fill in the holes. However, in doing so, the system should honor the push sequence for each direction (i.e., for each queue). The primary goal is determined solely by the queues and the current pushSeq's for the queues.

(2) Secondary Goal. The secondary goal is to push data from the queues alternately, such that the system approximates data flow as seen by an endpoint. To this end, the ACK's on the opposite queue give clues as to how much may be written from the current queue before pushing from the opposite queue. In an embodiment, to support the secondary goal, the system decides which queue pushes first and how much data should be pushed.

To provide context for the following sections, TCP flows can be in one of several general modes of operation, and may change between these modes at any time:

(1) Idle: the connection is making no progress. However, there may be "keep-alives" occurring now and then. A keep-alive is a TCP packet with a single byte of sequence space from earlier than the current pushSeq (i.e., out of window) with a value of zero. These packets should never be delivered to the application layer.

(2) Unidirectional: the connection has data streaming in only one direction.

(3) Bidirectional Synchronous: the connection has data streaming in opposing directions in alternation. This is the most common case for remote procedure call (RPC) based traffic.

(4) Bidirectional Asynchronous: both sides of the connection are pushing data toward the other side, but there is limited or no synchronization. An example of this type of TCP flow would be an X window or terminal session in which the user input is asynchronous to the data being displayed on the terminal. In this case, there are clues that indicate who might have "shot first," but it cannot be determined with absolute certainty which data was processed in what order by the respective hosts. Notably, not even the hosts are able to perform this determination.

4.2. States

In an embodiment, the ACK on the packet at the front of each queue (i.e., the first packet) is compared to the pushSeq on the opposing queue. There are three possible results of this comparison:

(1) The ACK points at the opposing pushSeq (i.e., they are equal).

(2) The ACK points before the opposing pushSeq (i.e., in the past).

(3) The ACK points after the opposing pushSeq (i.e., in the future).

This provides nine possible states for the two queues in combination. These states are illustrated in FIGS. 2A-2K, according to non-limiting examples. As mentioned above, in each of FIGS. 2A-2K, the vertical queue down the left side of the figure represents Q0, and the vertical queue down the right side of the figure represents Q1.

4.2.1. Q0.ACK==Q1.pushSeq && Q1.ACK>Q0.pushSeq

Figure 2A:
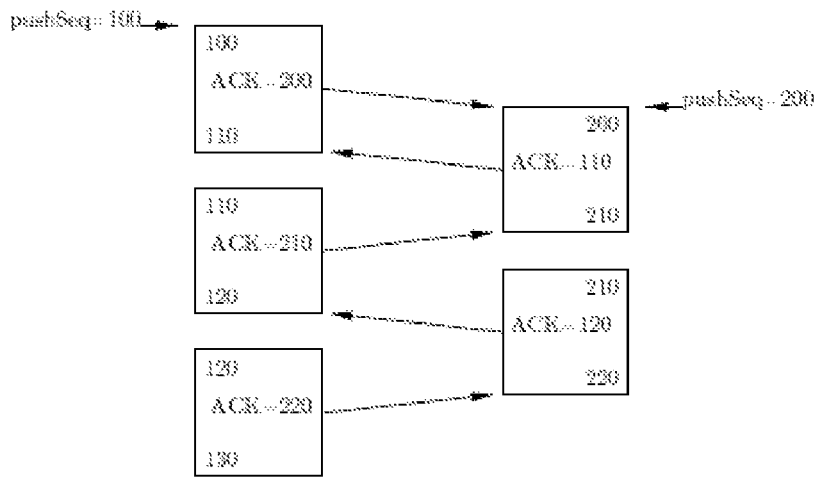
FIGS. 2A-2K illustrate queue states for non-limiting examples described herein.

FIG. 2A illustrates a normal push with the two queues in sync, according to a non-limiting example. Specifically, this is the state in which Q0.ACK (i.e., the acknowledgement in the first packet on Q0) equals Q1.pushSeq (i.e., the current pushSeq pointer for Q1) and Q1.ACK (i.e., the acknowledgement in the first packet on Q1) is greater than Q0.pushSeq (i.e., the current pushSeq pointer for Q0).

This state may represent the simplest case is one in which the two queues are associated with a fully synchronous RPC-like protocol (e.g., request-response) and a single packet makes up each message. This represents a large fraction of normal traffic on a non-lossy network.

In the illustrated state, Q0 is pushed, and the amount of data to push from Q0 is determined to be minimum (Q1.pkt.ack-Q0.pushSeq, Q0.pkt.len), wherein Q1.pkt.ack represents the acknowledgement value on the first packet of Q1, and Q0.pkt.len represents the length of the first packet of Q0.

4.2.2. Q0.ACK>Q1.pushSeq && Q1.ACK==Q0.pushSeq

Figure 2B:
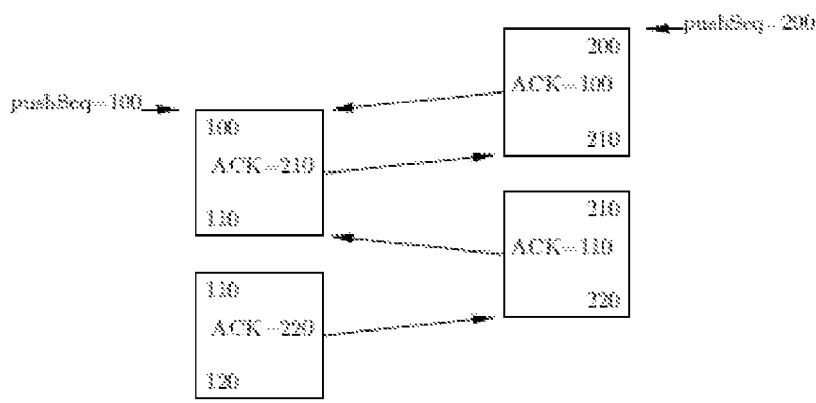

FIG. 2B illustrates a normal push with the two queues in sync, but in the alternate order than FIG. 2A, according to a non-limiting example. Specifically, this is the state in which Q0.ACK is greater than Q1.pushSeq and Q1.ACK is equal to Q0.pushSeq.

This case is the same as in FIG. 2A, but with the queues reversed. Thus, in the illustrated state, Q1 is pushed, and the amount of data to push from Q1 is determined to be minimum(Q0.pkt.ack-Q1.pushSeq, Q1.pkt.len).

4.2.3. Q0.ACK==Q1.pushSeq && Q1.ACK==Q0.pushSeq

Figure 2C:
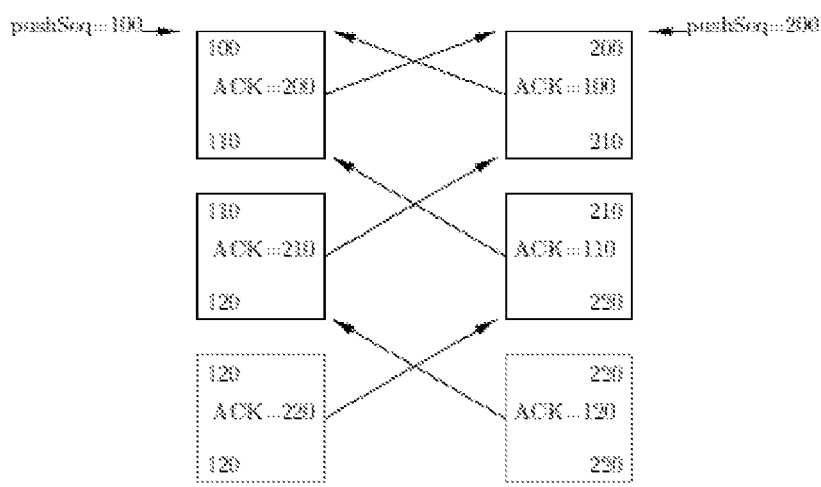

FIG. 2C illustrates a streaming "async" (i.e., asynchronous connection), according to a non-limiting example. Specifically, this is the state in which Q0.ACK is equal to Q1.pushSeq and Q1.ACK is equal to Q0.pushSeq. The illustrated case is a worst-case scenario, since both sides sent messages to each other more or less simultaneously.

In the illustrated state, there is no absolute right answer as to which queue to push first. This is a distributed MP race. Notably, even the hosts could not determine which host "shot first," i.e., sent their packet first.

In general, the algorithm cannot depend on the timestamps in the packets, since the capture infrastructure may have reordered the packets. However, in this case, the system may use the timestamp to bias what would otherwise be a random decision. Accordingly, in an embodiment, the system chooses a queue $Q_e$ that has the earliest first timestamp. The other queue may be referred to as $Q_l$.

To determine a push size (i.e., the amount of data to be pushed), the opposing queue $Q_l$ can be scanned for an ACK ($ACK_{next}$) that is greater than the first ACK in $Q_e$. In this case, the system is looking specifically at the ACK's to infer the sequence numbers on the opposing queue. A bump in the ACK would indicate that the other side sent a message and the current side acknowledged it, providing a good indication that there was a message turnaround without actually seeing one. This forward change in ACK can be used to end the push and give the other side of the connection a chance to push. Using the timestamps and the change in ACK to signal a push swap represent an educated guess, since the system may not able to determine the true ordering, given the dataset.

Thus, in the state illustrated in FIG. 2C, the Q with the packet having the earliest timestamp is pushed, and the amount of data to push from $Q_e$ is determined to be $ACK_{next}$-$Q_e$.pushSeq. This is an instance in which the ACK's and pushSeq's show a fully overlapped connection with both sides sending asynchronously. In an embodiment, the system will break the "tie" regarding which queue to push first by comparing the timestamps on the first packet of each queue. The amount or length it will push will be determined by the size of the first change in ACK observed on the opposing queue. For instance, if Q1 has the earlier traffic, Q0 has a change from Q1's pushSeq of 200 to 210 on the second packet. Thus, the system will push packets off Q1 until Q1's pushSeq is up to ACK 210. In this case, the system will push the packet with starting sequence number 200 and ending sequence number 210 off of Q1 (the system will not yet push the packet with starting sequence number 210).

Figure 2D:
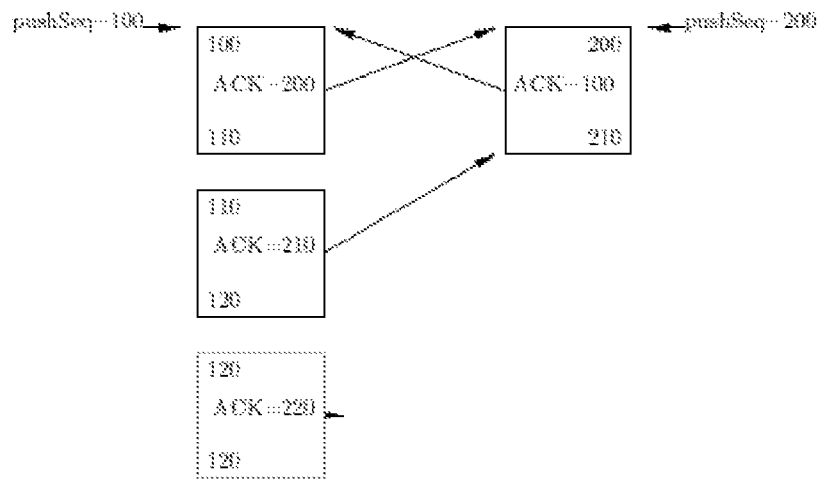

In a variation of this state, illustrated in FIG. 2D, according to a non-limiting example, no additional packets are on the opposing queue to provide a message size. A similar variation (not shown) is one in which all the ACK's on the opposing queue point at the chosen queue's pushSeq (i.e., $Q_e$.pushSeq). The variation illustrated in FIG. 2D is similar to a unidirectional stream situation, since that is essentially what remains after two pushes. In this case, the entire packet is pushed. Thus, $Q_e$ is pushed, and the amount of data to push from $Q_e$ is determined to be the full sequence size of the first packet $Q_e$.pkt.

4.2.4. Q0.ACK<Q1.pushSeq && Q1.ACK==Q0.pushSeq

Figure 2E:
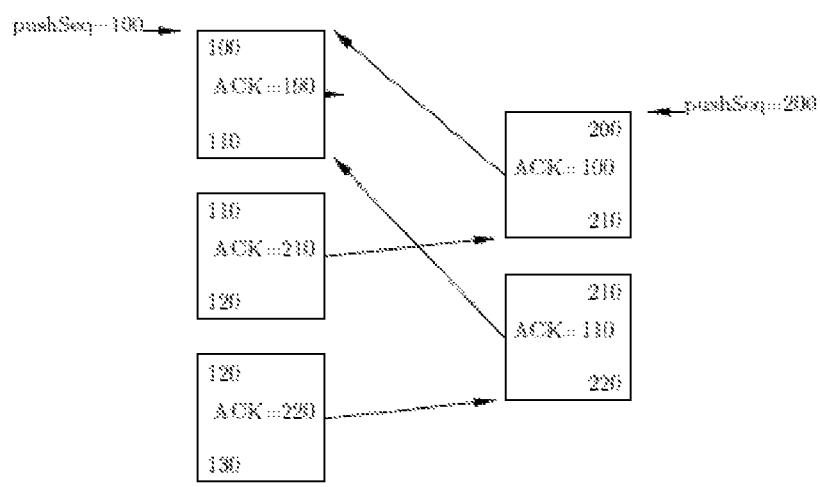

FIG. 2E illustrates the state in which Q0's first ACK is in the past, according to a non-limiting example. Specifically, this is the state in which Q0.ACK is less than Q1.pushSeq and Q1.ACK is equal to Q0.pushSeq.

This case is essentially the same as the case in Section 4.2.3. The two sides are pushing against each other, so the algorithm cannot determine with absolute certainty which side sent its message first. This could result from packet loss that is visible to the endpoints, but not visible in the system's third-party view.

When the Q0 packet at sequence number (SEQ) 100 was received, Q0's host had already seen Q1's SEQ 190. However, the system cannot determine the ACK on any of the packets containing SEQ 190 on Q1. Accordingly, the system may use timestamps as a clue, and treat this state in the same manner as described in Section 4.2.3. In the illustrated case, Q0 would be chosen as $Q_e$, since it has the earliest timestamp, $ACK_{next}$ would be determined to be "110," and thus the first packet from $Q_e$ (i.e., Q0:100-110) would be pushed.

4.2.5. Q0.ACK==Q1.pushSeq && Q1.ACK<Q0.pushSeq

Figure 2F:
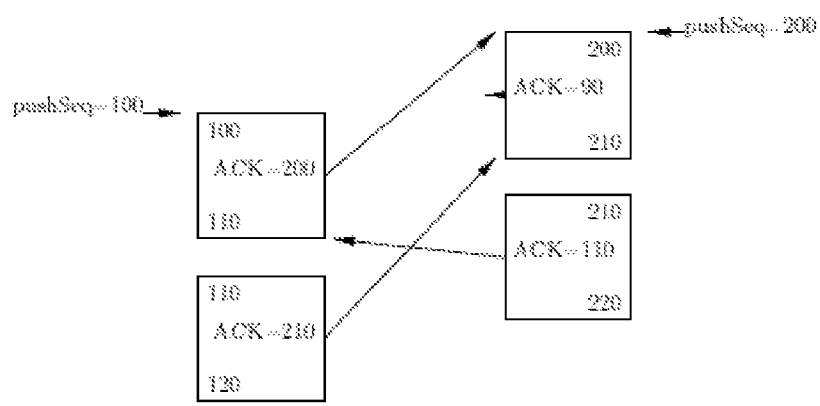

FIG. 2F illustrates the state in which Q1's first ACK is in the past, according to a non-limiting example. Specifically, this is the state in which Q0.ACK is equal to Q1.pushSeq and Q1.ACK is less than Q0.pushSeq. In other words, this state is the same as the state described in Section 4.2.4, but with the queues reversed. Accordingly, the system may also treat this state in the same manner as described in Section 4.2.3.

4.2.6. Q0.ACK>Q1.pushSeq && Q1.ACK<Q0.pushSeq

Figure 2G:
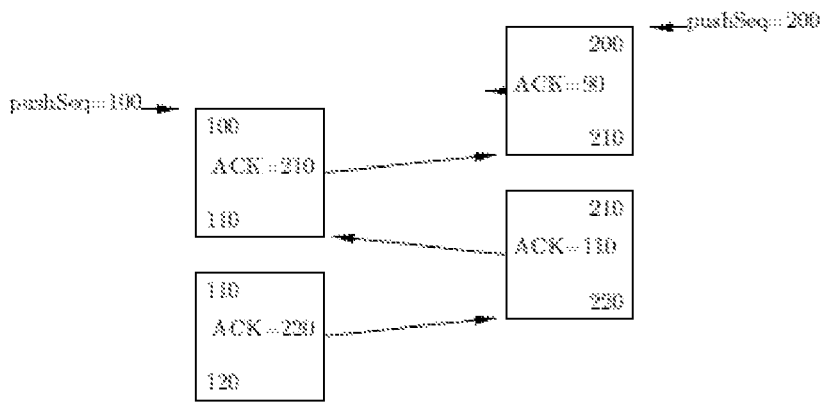

FIG. 2G illustrates the state in which Q0's first ACK is in the future and Q1's first ACK is in the past, according to a non-limiting example. Specifically, this is the state in which Q0.ACK is greater than Q1.pushSeq and Q1.ACK is less than Q0.pushSeq. This is similar to the in-sync state described in Section 4.2.1.

The system may treat the out-of-window ACK (i.e., ACK 90 in the illustrated example) as pointing at the opposing queue's pushSeq (i.e., SEQ 100 in the illustrated example). Accordingly, in the state illustrated in FIG. 2G, Q1 is pushed, and the amount of data to push from Q1 is determined to be Q0.pkt.ack−Q1.pushSeq (i.e., 210−200=10 in the illustrated example).

4.2.7. Q0.ACK<Q1.pushSeq && Q1.ACK>Q0.pushSeq

Figure 2H:
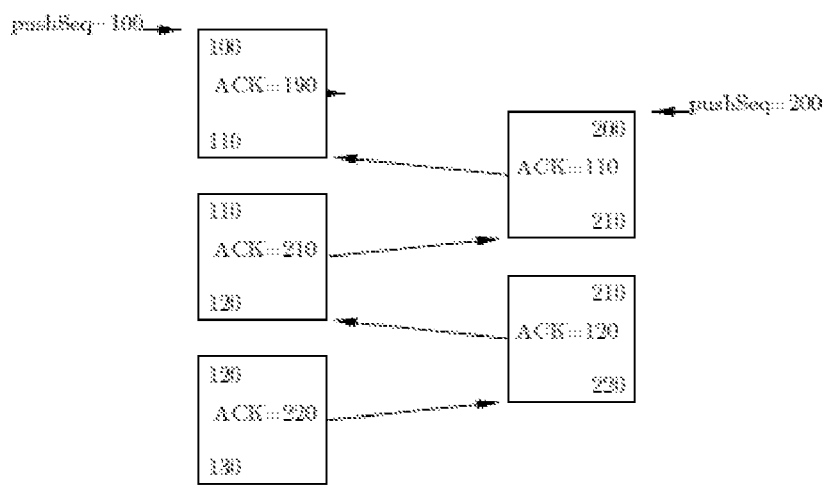

FIG. 2H illustrates the state in which Q0's first ACK is in the past and Q1's first ACK is in the future, according to a non-limiting example. Specifically, this is the state in which Q0.ACK is less than Q1.pushSeq and Q1.ACK is greater than Q0.pushSeq. In other words, this state is the same as the state in Section 4.2.6, but with the queues reversed. Accordingly, in this state, Q0 is pushed, and the amount of data to push from Q0 is determined to be Q1.pkt.ack-Q0.pushSeq.

4.2.8. Q0.ACK<Q1.pushSeq && Q1.ACK<Q0.pushSeq

Figure 2I:
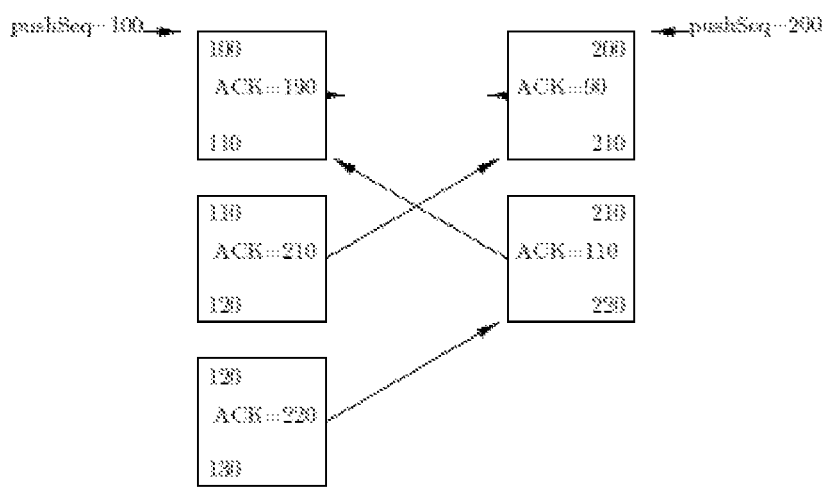

FIG. 2I illustrates the state in which Q0's first ACK and Q1's first ACK are both in the past, according to a non-limiting example. Specifically, this is the state in which Q0.ACK is less than Q1.pushSeq and Q1.ACK is less than Q0.pushSeq. Since both ACKs are in the past, the system may treat this state in the same manner as the state with crossing ACKs described in Section 4.2.3.

Figure 2J:
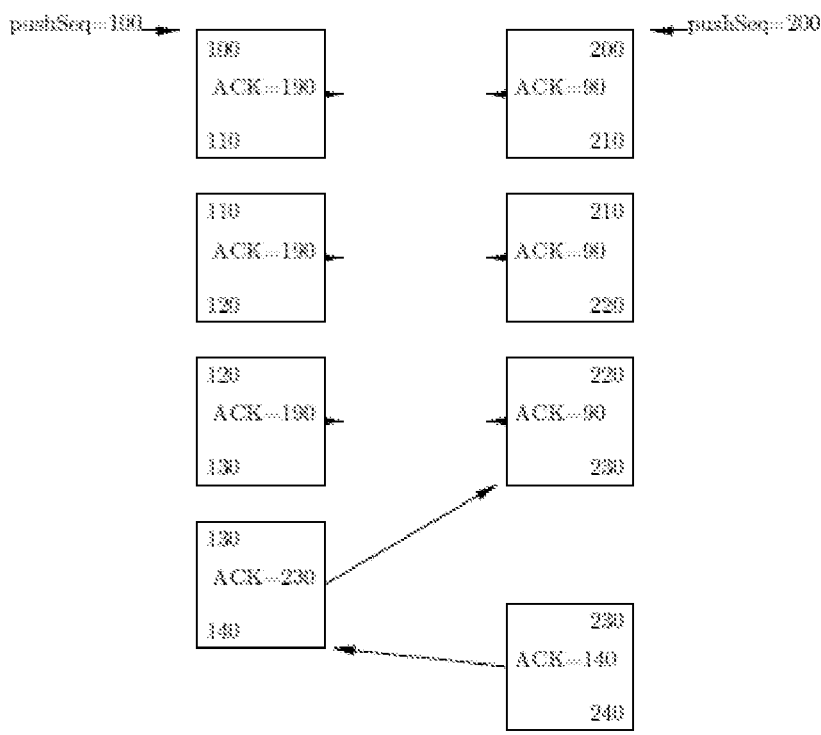

FIG. 2J illustrates an expanded and more realistic variation of the state illustrated in FIG. 2I, according to a non-limiting example. Essentially, in this variation, two streams are pushing at each other and trying to fill their windows independently. The ACKs provide almost no useful synchronization information in the regions in which the packets are in flight towards each other. The system may handle this state in the same manner as the state illustrated in FIG. 2I (as described in Section 4.2.3).

4.2.9. Q0.ACK>Q1.pushSeq && Q1.ACK>Q0.pushSeq

Figure 2K:
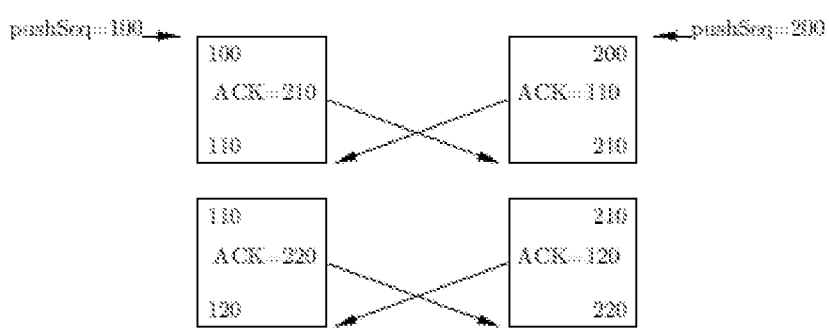

FIG. 2K illustrates the state in which Q0's first ACK and Q1's first ACK are both in the future, according to a non-limiting example. This state appears to violate basic causality. However, this state may result from retransmissions involved in a bidirectional asynchronous-style connection. The algorithm can treat this state in the same manner as the state with crossing ACKs described in Section 4.2.3.

4.3. Duplicate Discarding (Trimming/Splitting)

4.3.1. Trimming Packets with Payload

Duplicate sequence spaces may appear in at least four varieties:

(1) Verbatim Duplicates. Verbatim duplicates occur when the capture infrastructure or the endpoint TCP stacks send packets with the same exact SEQ and ACK numbers multiple times. Endpoints may do this in response to simple packet loss on a bidirectional synchronous connection.

(2) Moving ACK Duplicates. Moving ACK duplicates occur when duplicate packets are sent, but the ACK's are higher than in the original packets. This can happen in bidirectional asynchronous connections when traffic in the other direction continues to flow, thereby incrementing the endpoints window and ACK.

(3) Coalesced Duplicates. Coalesced duplicates occur when an endpoint sends data in several packets and does not receive an ACK, and then retransmits all of the unacknowledged data in less than the original number of packets (e.g., in a single packet). The carried ACKs may move forward (e.g., if there is flowing traffic in the opposite direction) or be duplicates of the highest previously-seen ACK.

(4) Split Duplicates. Split duplicates occur when the transmitting endpoint misses one of several ACKs, and then retransmits some subset of the sequence space that lies in the middle of the packet boundaries of the original transmissions.

(5) Keep-alives. A keep-alive is a packet with a single byte of payload. The sequence number may precede an ACK previously received by the sending endpoint (i.e., out of window). Thus, the keep-alive packet may appear as a duplicate with different data (e.g., usually a single zero byte).

When packets are sorted on the reception queues, they are placed at the latest valid position in the queue based on the temporal or chronological order in which they are received. In all of the duplicate cases described above—with the exception of split duplicates—the system may discard the duplicate data when processing the queue if the pushSeq for the queue has moved beyond the sequence number of the duplicate data.

Figure 3A:
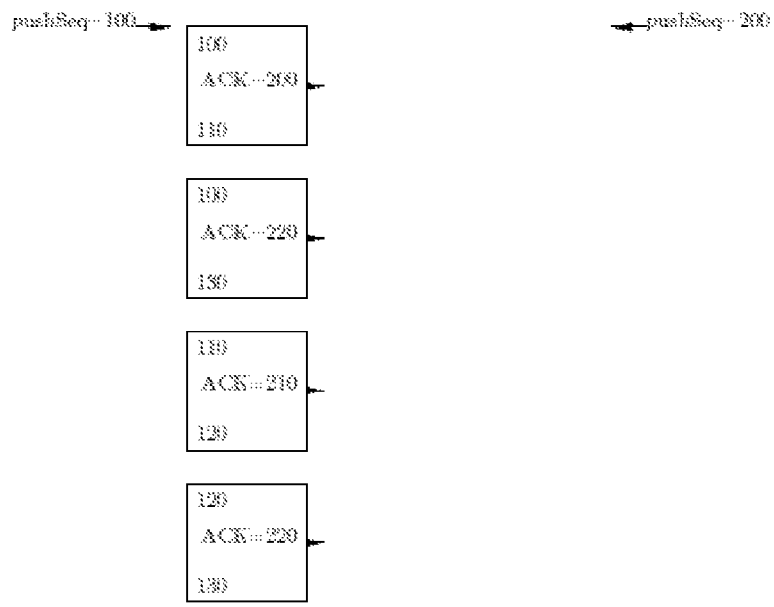
FIGS. 3A-3B illustrate queue states for non-limiting examples described herein.
Figure 3B:
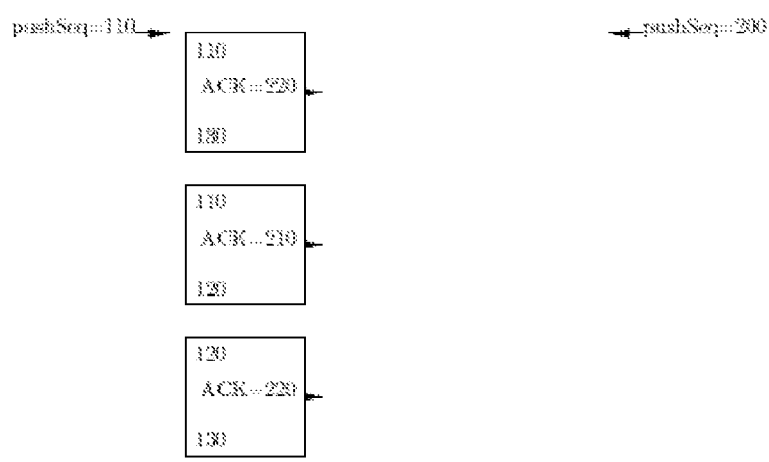

The split duplicates case is illustrated in FIGS. 3A and 3B, according to a non-limiting example. FIG. 3A illustrates the initial state with a large retransmission SEQ 100-130 that will be split into SEQ 100-110, SEQ 110-120, and SEQ 120-130. FIG. 3B illustrates the state after the split of the retransmitted packet SEQ 100-130 into SEQ 110-130 (and the duplicate SEQ 100-110) that leaves the remaining original transmissions SEQ 110-120 and SEQ 120-130 in Q0 as duplicates. The ACK of the retransmitted packet will likely be in the future compared to the partial duplicated data received earlier. Since the SEQ of this larger, coalesced message is lower than in the originally transmitted data, it will remain first on the queue, and its future sequence number will be effective for the next push. The original packets SEQ 110-120 and SEQ 120-130 will be discarded as duplicates after the larger push, and their sequence numbers will not be used for anything.

If an entire packet is to be trimmed, but the ACK of the packet is beyond the opposite pushSeq, the system can force progress on the queue due to the ACK. The payload is trimmed out of the packet, but an empty ACK-only packet is left behind with the latest ACK seen during trimming. When the network is noisy (i.e., dropping a lot of packets), one of the two sides of the connection (i.e., one of the network agents or hosts) may be retransmitting old data to the other side (i.e., the other network agent or host). However, it will send along the most recent ACK number that it has. The system does not care about the data, since it may be a duplicate (i.e., earlier than the current pushSeq), but the extra ACK can be used to help synchronize the two sides of the connection. If the extra ACK was simply dropped, it could end up stalling the connection in some edge cases. Thus, a new pseudo-packet is created with no payload but the extra (i.e., fresher) ACK. This pseudo-packet is placed on the queue, instead of the original packet with the duplicate data, which can be discarded.

4.3.2. Trimming Packets without Payload

The normal push algorithms of the system described throughout Section 4 will leave the trailing ACK of a conversation on a queue. If left on the queue until the system forces progress (described in Section 5), the force of progress would insert an ACK-only packet on the opposite queue, which would retire the initial ACK-only packet. Subsequently, the algorithm may again force progress by inserting an ACK-only packet on the queue to retire the ACK-only packet inserted on the opposite queue, and so forth. There is no value to leaving a "consumed" ACK on the queue. It does not allow progress any sooner on the opposing queue, since it is pointing at the pushSeq of the opposing queue. Thus, while trimming packets, the system may discard all leading ACK-only packets that point at or before pushSeq on the opposing queue (but within the window).

5. FORCING PROGRESS

In an embodiment, the system forces progress to transform the connection state by adding synthetic traffic to one queue and/or forcing the connection to resynchronize. After the force of progress is applied, both queues should be in one of the states described in Section 4.2.1-4.2.9, and the algorithm implemented by the system can be applied in the manners described in those sections.

In an embodiment, to avoid looping, the force of progress by the system puts the queues in a position in which some existing traffic on one of the queues can be pushed immediately. Two gap packets which result in the gaps being pushed and a return to the initial state should not be allowed.

5.1. Triggers

In an embodiment, the system forces progress in response to one or more of the following triggers or conditions:

(1) The sum of the count of packets on both queues exceeds a threshold number of packets. An active connection with some loss may trigger this case as a gap gets stuck at the pushSeq of one of the queues and packets build up on the queues.

(2) The connection has been idle with no new packets queued for a predetermined time.

(3) The connection is closed. Since no further traffic can be expected, the queues should be emptied out or "drained."

5.2. Definitions

Variables used in describing the system's management of various states in this Section will now be described.

ACK: the acknowledgement of the first ready packet (from the queue that has valid data at its pushSeq).

$ACK_{next}$: the second unique and greater acknowledgement number on the ready queue that is greater than the opposite pushSeq. This variable may be undefined, and determined, for example, according to the following pseudocode:

```
a=undefined;
for(pkt : queue) {
    if(pkt.ACK < opposite pushSeq) { continue; }
    if(a==undefined) {
        a=pkt.ACK;
        continue;
    }
    if(pkt.ACK > a) {
        return pkt.ACK;
    }
}
return undefined;
Copyright 2013 DB Networks.
```

$ENDSEQ_{firstAck}$: the ENDSEQ of the last contiguous (ACK-wise) packet on the ready queue that has the same ACK as the first packet on the ready queue. This variable may be determined, for example, according to the following pseudocode:

```
lpkt = first packet on queue
for(pkt : queue) {
    if(pkt.ACK != lpkt.ACK) { break; }
    lpkt = pkt;
}
ENDSEQ = lpkt.endseq( );
Copyright 2013 DB Networks.
```

$pushSeq_{ready}$: the pushSeq on the ready queue.
$pushSeq_{gap}$: the pushSeq on the queue with the gap.
$SEQ_{gap}$: generated gap sequence number for the generated gap packet.
$LEN_{gap}$: generated gap length for the generated gap packet.
$ACK_{gap}$: generated gap ACK for the generated gap packet.
$firstSeq_{gap}$: the sequence number of the first real data on the queue with the gap.
$firstAck_{gap}$: the acknowledgement of the first real data on the queue with the gap.

5.3. States

In an embodiment, the degrees of freedom for each queue are:

(1) Ready, Gap, or Empty; and
(2) ACK<opposite pushSeq, ACK==opposite pushSeq, or ACK>opposite pushSeq.

The queue states for the forcing of progress may be summarized as follows:

|  | Q1 ready | Q1 gap | Q1 empty |
| --- | --- | --- | --- |
| Q0 ready | ready to push (described in § 4) | simple loss (described in § 5.3.1) | unidirectional (described in § 5.3.2) |
| Q0 gap | simple loss (described in § 5.3.1) | big loss (described in § 5.3.3) | unidirectional with loss (described in § 5.3.4) |
| Q0 empty | unidirectional (described in § 5.3.2) | unidirectional with loss (described in § 5.3.4) | connection is idle |

5.3.1. One Queue Has Gap, Other Queue Ready

The queue state of Q0 has a gap and Q1 is ready or Q1 has a gap and Q0 is ready may result from single or minor loss in one direction. How the system handles the case depends on the "good" ACK (i.e., the ACK in the first packet on the ready queue), as discussed below.

5.3.1.1. ACK>pushSeq$_{gap}$

Figure 4A:
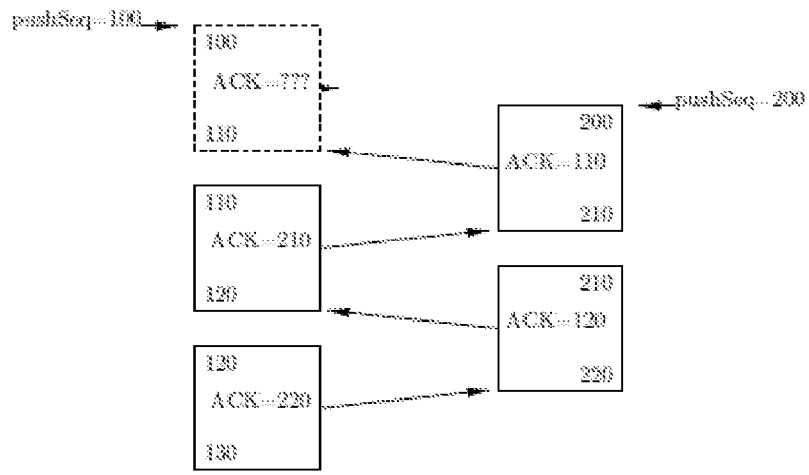
FIGS. 4A-4C illustrate queue states for non-limiting examples described herein.

FIG. 4A illustrates a queue state in which Q0 has a gap, Q1 is ready, and Q1 ACK is greater than Q0.pushSeq, according to a non-limiting example. In this state, the system will push the gap first. The system will generate the gap to cover the sequence space up to the opposite ACK or the full space of the gap. Thus:

SEQ$_{gap}$=pushSeq$_{gap}$
LEN$_{gap}$=minimum(firstSEQ$_{gap}$−pushSeq$_{gap}$, ACK−pushSeq$_{gap}$)
ACK$_{gap}$=pushSeq$_{ready}$ Consequently, in the example illustrated in FIG. 4A, the system would generate a gap packet with a starting sequence number of 100, a length of 10 (i.e., 110-100), and an acknowledgment number of 200.

5.3.1.2. ACK==pushSeq$_{gap}$

Figure 4B:
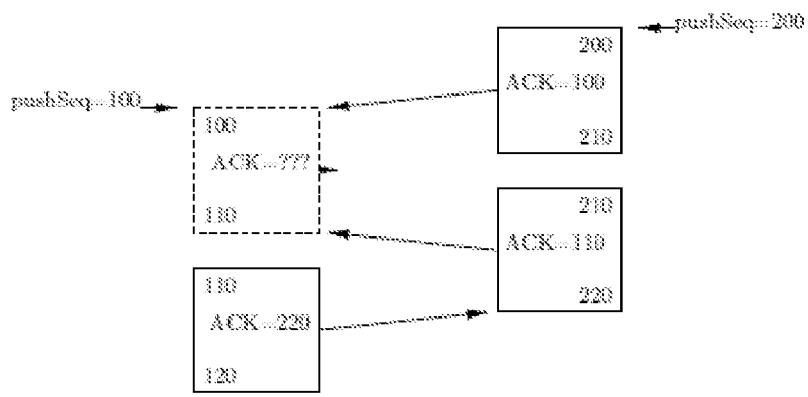

FIG. 4B illustrates a queue state in which Q0 has a gap, Q1 is ready, and Q1 ACK is equal to Q0.pushSeq, according to a non-limiting example. In this state, the ready queue (i.e., Q1, in the illustrated example) will be pushed first, with the transform handled in the manner described in Section 4.2.2.

The length is inferred from the ACK traffic on the good queue:

```
SEQ_gap = pushSeq_gap
LEN_gap
    if(ACK_next == defined && ACK_next > pushSeq_gap &&
       ACK_next < firstSeq_gap) {
        ACK_next − pushSeq_gap
    } else {
        if(firstSeq_gap in window around pushSeq_gap) {
            firstSeq_gap − pushSeg_gap
        } else {
            0
        }
    }
ACK_gap = ENDSEQ_firstAck
Copyright 2013 DB Networks.
```

Consequently, in the example illustrated in FIG. 4B, the system would generate a gap packet with a starting sequence number of 100, a length of 10, and an acknowledgment number of 210. In this case, the system essentially allows Q1 to make progress before Q0 by pulling the ACK forward.

5.3.1.3. ACK<pushSeq$_{gap}$

Figure 4C:
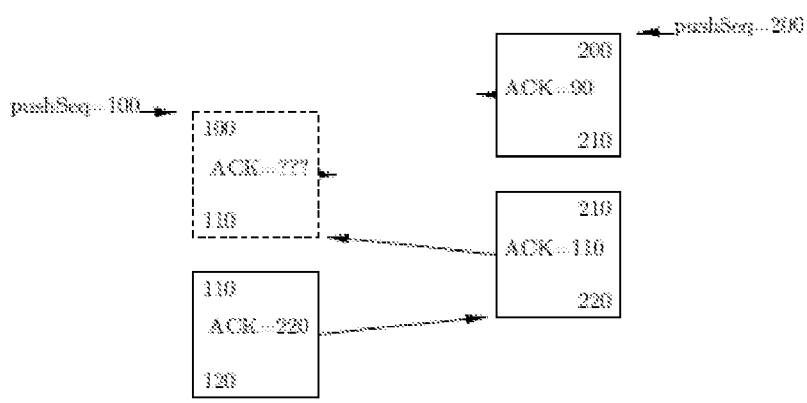

FIG. 4C illustrates a queue state in which Q0 has a gap, Q1 is ready, and Q1 ACK is less than Q0.pushSeq, according to a non-limiting example. This state can be treated in the same manner as the state in Section 5.3.1.2. In this state, the ready queue will be pushed first, with the transform handled in the manner described in Section 4.2.6.

5.3.2. One Queue Empty, Other Queue Ready

The states in which one queue is empty and the other queue is ready may be the result of unidirectional traffic. These states are similar to the set of states described in Section 5.3.1, but there is no firstSeq$_{gap}$ or firstACK$_{gap}$ available. Again, how the system will handles these cases depends on the good ACK.

5.3.2.1. ACK>pushSeq$_{gap}$

Figure 5A:
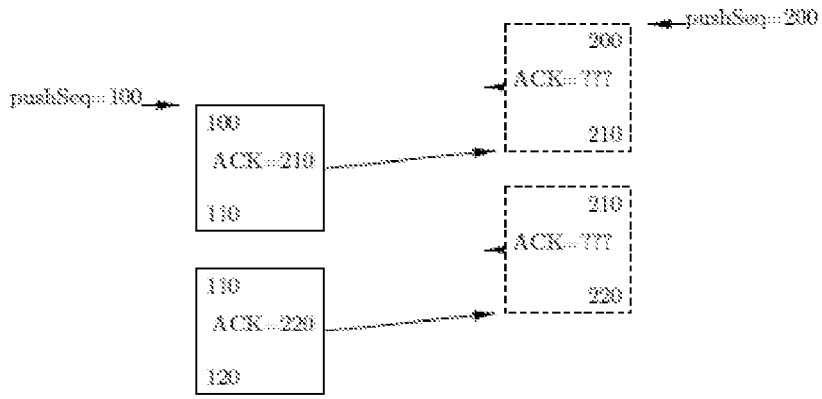
FIGS. 5A-5C illustrate queue states for non-limiting examples described herein.

FIG. 5A illustrates a queue state for unidirectional traffic in which Q0 is ready and the gap is pushed first. The system will push the gap first, with the transform handled in the manner described in Section 4.2.1. Thus:

SEQ$_{gap}$=pushSeq$_{gap}$
LEN$_{gap}$=ACK−pushSeq$_{gap}$
ACK$_{gap}$=pushSeq$_{ready}$ Consequently, in the example illustrated in FIG. 5A, the system would generate a gap packet with a starting sequence number of 200, a length of 10, and an acknowledgment number of 100.

5.3.2.2. ACK==pushSeq$_{gap}$

Figure 5B:
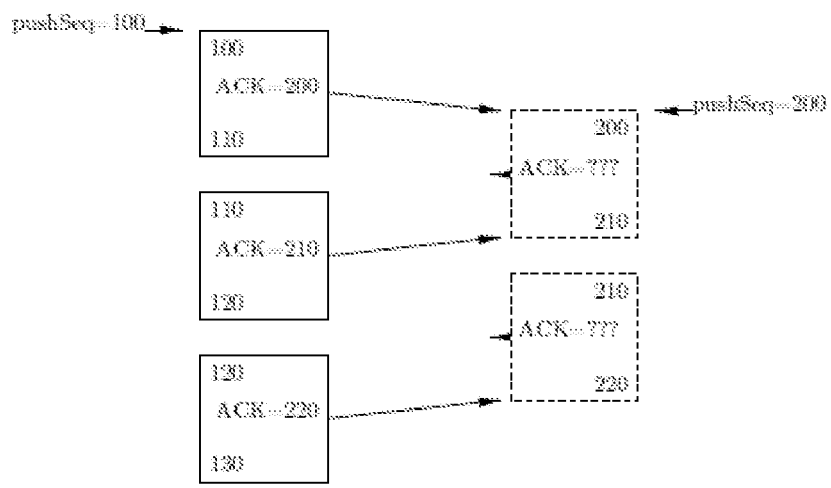

FIG. 5B illustrates a queue state for unidirectional traffic in which Q0 is ready, and Q0 is pushed first. The system will push the ready queue first (i.e., the Q0:100-110 packet), with the transform handled in the manner described in Section 4.2.2:

```
SEQ_gap = pushSeq_gap
LEN_gap
    if (ACK_next == defined) {
        ACK_next − pushSeq_grp
    } else {
        0
    }
ACK_gap = ENDSEQ_firstAck
Copyright 2013 DB Networks.
```

Consequently, in the example illustrated in FIG. 5B, the system would generate a gap packet with a starting sequence number of 200, a length of 10 (i.e., 210-200), and an acknowledgment number of 110. In this case, the packet with the valid data on Q0 is pushed first, and the generated gap packet on Q1 fills in its missing ACK.

5.3.2.3. ACK<pushSeq$_{gap}$

Figure 5C:
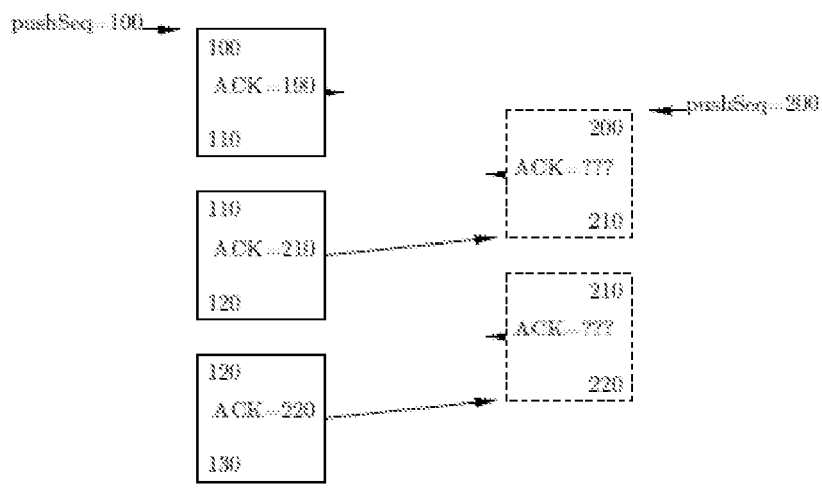

FIG. 5C illustrates a queue state for unidirectional traffic in which Q0 is ready, and the gap is pushed first. This state may be treated in the same manner as the state described in Section 5.3.2.2. The system will push the ready queue first, with the transform handled in the manner described in Section 4.2.6.

5.3.3. Both Queues Have a Gap

Figure 6A:
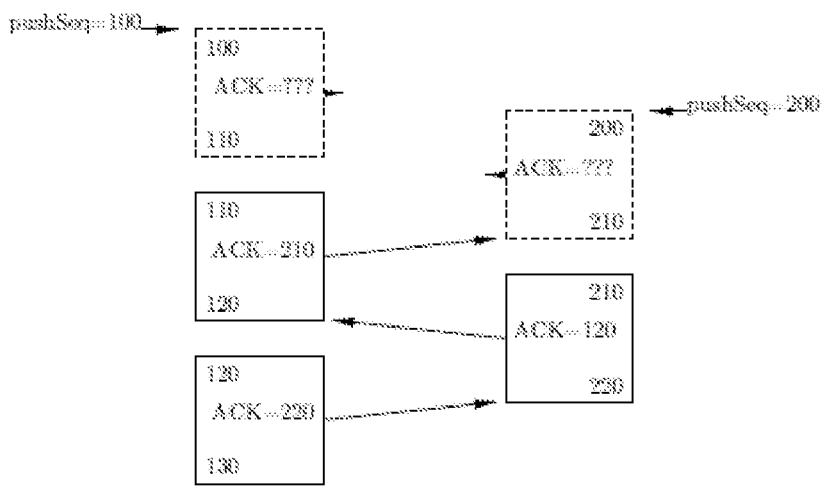
FIGS. 6A-6B illustrate queue states for non-limiting examples described herein.
Figure 6B:
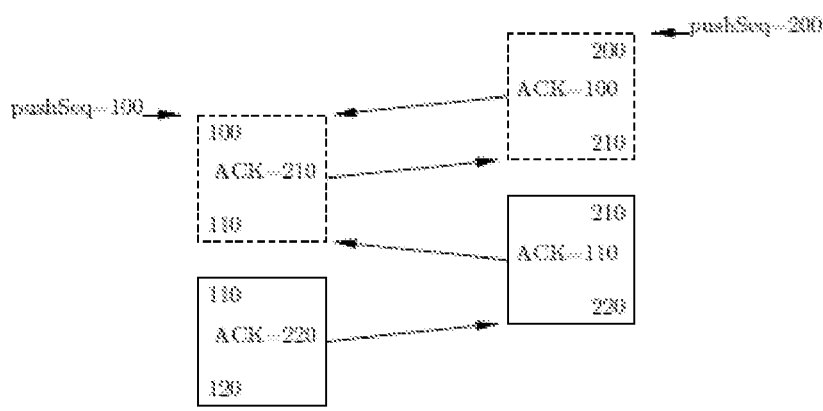

Queue states in which there is significant packet loss, affecting both sides of the connection at the same time, will now be described. FIG. 6A illustrates a queue state with gaps on both sides in which Q0 is pushed first, according to a non-limiting example. Conversely, FIG. 6B illustrates a queue state with gaps on both sides in which Q1 is pushed first, according to a non-limiting example. In both of these cases, continuity has been lost, and no valid assumptions about the size and ACK ordering can be made since there may have been one packet, as illustrated, or dozens of RPC turnarounds in the gaps.

The system could use a heuristic, based on a small enough gap, and fill in the gaps so that the ordering matches the traffic that follows. However, this approach might associate incorrect portions of the RPCs together (e.g., REQ+REQ or RSP+RSP).

In this case, the system can send a connection re-sync message to the application layer (as discussed elsewhere herein), which will cause any bundle to be flushed out, and reinitiate the pushSeq's. The downside of this approach is that a request with a large response that had loss in the middle could be broken into two pieces (with the re-sync message in the middle) at the application layer. The system may not be able to discriminate between this case and the case in which there are a dozen RPC turnarounds during the double gap. However, in asynchronous streaming mode, this gap message should be no more disruptive than a normal gap packet on each side.

5.3.4. One Queue Empty, Other Queue Has a Gap

Figure 7:
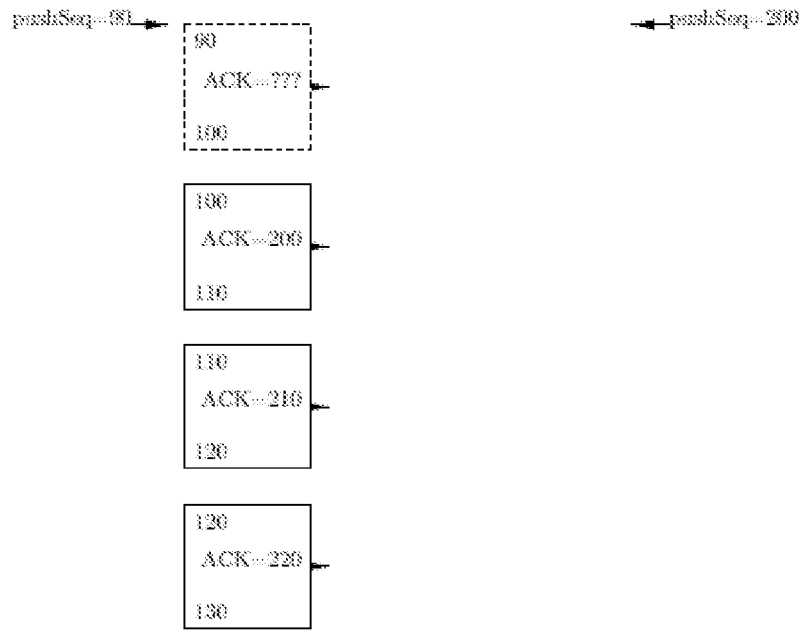
FIG. 7 illustrates a queue state with unidirectional traffic in which one queue has a gap, according to a non-limiting example described herein.

FIG. 7 illustrates a queue state with unidirectional traffic in which Q0 has a gap, according to a non-limiting example. This state may be the result of unidirectional traffic with packet loss on the side that can be seen. There are the usual ACK possibilities. However, in this state, the comparison is against the ACK in the first packet beyond the gap.

The system can treat these cases in the same manner as the double-gap case described in Section 5.3.3 by sending a connection re-sync to the application layer and reinitializing the pushSeq's based on the current queue state. This will result in the non-empty queue's pushSeq warping to the start of traffic, and the opposing pushSeq being set up so that a unidirectional push will work, as described in Section 5.3.2. In this case, the connection is in a state in which the system can infer that data has been lost in both directions. Thus, a gap packet should be pushed on both queues to force progress. There may not be enough data to infer anything about the ordering or size of the gaps, so the system notifies the application layer (via the connection re-sync message) that there is a large "hole" or gap and to reset the connection.

5.3.4.1. ACK>pushSeq$_{empty}$

In this case, the system will push the gap on the other side first. However, the system may not be able to determine whether or not the gap on the side with packets is part of the message that follows it.

5.3.4.2. ACK==pushSeq$_{empty}$

This state is illustrated in FIG. 7. The system may not be able to determine whether or not the gap is part of a previous message or part of a message that ends with the first packet on Q0 (or a later packet if there are multiple packets with the same ACK).

5.3.4.3. ACK<pushSeq$_{empty}$

In this state, there is similar uncertainty. However, it is likely that the state represents an original packet before retransmission. Thus, the system may infer that this is the case. In this case and in the case described in Section 5.3.4.2, the connection is in a state in which the available packets do not provide enough clues to definitively reconstruct the missing traffic pattern. Thus, in both cases, the system may provide a connection re-sync message to the application layer.

6. ALGORITHMS

Pseudocode that may be implemented by the system as algorithms for managing the cases discussed above will now be described.

6.1. Packet Receive

In an embodiment, the system implements a classification algorithm that collects one or more packets related to a single connection in a batch, and delivers this batch to a function, which is referred to herein as "packetBatch( )", and which may be implemented according to the following pseudocode:

```
packetBatch(pkts) {
    for(pkt : pkts) {
        packetRx(pkt)
    }
    driveConnection( );
}
packetRx(pkt) {
    Q = choose queue based on packe src/dst
    sort pkt onto Q
}
driveConnection( ) {
    progress = true;
    while(progress) {
        progress = pushQueues( );
        if(!progress) {
            progress = maybeForceProgress( );
        }
    }
}
```
Copyright 2013 DB Networks.

As shown, the packetBatch( ) function sorts the packets received from the capture device (e.g., a physical or virtual network tap on a connection between two communicating network agents) onto one of the two queues, depending on the transmission direction of the packet, and drives the connection to push packets from the queues and potentially force progress when appropriate.

6.2. Normal Progress

In an embodiment, the system prepares the queues and determines whether or not there is data on both queues at their pushSeq's. The system also deals with initializing the pushSeq's. For example, the function "pushQueues( )" may be implemented according to the following pseudocode:

```
pushQueues( ) {
    pushSeqCheck( );
    if(Q0.empty( ) || Q1.empty( )) {
        return false;
    }
    if(!Q0.prePush( ) || !Q1.prePush( )) {
        return false;
    }
    // Handle the nine states described in Sections 4.2.1-9
    if(
        (Q0.ack==Q1.pushSeq && Q1.ACK > Q0.pushSeq) ||
        (Q0.ack < Q1.pushSeq && Q1.ACK > Q0.pushSeq)
    ) {
        Q0.push(min(Q1.ACK – Q0.pushSeq, Q0 .pkt.len));
    } else if(
        (Q0.ack > Q1.pushSeq && Q1.ACK==Q0.pushSeq) ||
        (Q0.ack > Q1.pushSeq && Q1.ACK < Q0.pushSeq)
    ) {
        Q1.push(min(Q0.ACK – Q1.pushSeq, Q1.pkt.len));
    } else if(
        (Q0.ack==Q1.pushSeq && Q1.ACK==Q0.pushSeq) ||
        (Q0.ack < Q1.pushSeq && Q1.ACK==Q0.pushSeq) ||
        (Q0.ack==Q1.pushSeq && Q1.ACK < Q0.pushSeq) ||
        (Q0.ack < Q1.pushSeq && Q1.ACK < Q0.pushSeq) ||
        (Q0.ack > Q1.pushSeq && Q1.ACK > Q0.pushSeq)
    ) {
        Qe = queue with earliest timestamp on first pkt
        Ql = other queue
        ackNext = Ql.ackNext(Qe.pushSeq);
        if(ackNext==defined) {
            Qe.push(ackNext – Qe.pushSeq);
        } else {
            Qe.push(Qe.pkt.len);
        }
    }
    return true;
}
```
Copyright 2013 DB Networks.

6.3. PushSeq Initialization and Multi-Universe Checks

In an embodiment, the system prepares a queue for a push using a function, referred to herein as "pushSeqCheck( )" which may be implemented according to the following pseudocode:

```
pushSeqCheck( ) {
    if(both queues empty) {
        return;
    }
    if(
        (!Q0.empty && !Q1.pushSeq.inWindow(Q0.pkt.ACK)) ||
        (!Q1.empty && !Q0.pushSeq.inWindow(Q1.pkt.ACK)) {
        initPushSeqs = true;
    }
    if(!initPushSeqs) {
        return;
    }
    Q = queue with earliest packet (or any packet)
    Qo = other queue
    Q.pushSeq = Q.pkt.SEQ;
    Qo.pushSeq = Q.pkt.ACK;
    initPushSeqs = false;
}
Copyright 2013 DB Networks.
```

Essentially, pushSeqCheck( ) initializes the pushSeq's of the two queues if it is determined that a first one of the queues is not empty and the second queue is out of window with respect to the first queue. This initialization entails determining the queue with the packet having the earliest timestamp, setting that earliest queue's pushSeq to the starting sequence number of the earliest queue's first packet, and setting the other queue's pushSeq to the acknowledgement number of that earliest queue's first packet. It should be noted that, while the utilization of timestamps as hints may be imperfect at times, it tends to be better than choosing randomly.

6.4. Queue Utilities

In an embodiment, the system comprises a number of utility functions for the queues. For instance, the queue class may implement a function, referred to herein as "prePush( )" to prepare a queue for a push, for example, according to the following pseudocode:

```
Q.prePush( ) {
    trim( );
    if (empty( )) {
        // Nothing after trim
        return false;
    }
    if(pkt.seq != pushSeq) {
        // gap at pushSeq
        return false;
    }
    return true;
}
Copyright 2013 DB Networks.
```

As shown, the prePush( ) function determines whether the queue can be pushed without anything getting in the way (e.g., ACK-based sync gap, etc.)

The queue class may implement a function, referred to herein as "trim( )" to trim duplicate data from a queue, for example, according to the following pseudocode:

```
Q.trim( ) {
    laterAck = undefined;
    for(;;) {
        pkt = top of Q
        if(!pkt) {
            break;
        }
        if(!empty packet && pkt.endseq > pushSeq) {
```

-continued

```
            if(pkt.seq >= pushSeq) {
            } else {
                split packet and discard split part before pushSeq
            }
            // all or some of packet is new data, done
            if(laterAck.defined( )) {
                pkt.ack = laterAck;
                laterAck = undefined;
            }
            break;
        }
        if(pkt.ack > opposite pushseq && pkt.ack > laterAck) {
            laterAck = pkt.ack;
        }
        discard packet
    }
    if(laterAck==defined) {
        create an empty ACK-only packet at the pushSeq
    }
}
Copyright 2013 DB Networks.
```

As shown, the trim( ) function scrubs retransmitted (i.e., duplicate) data from the queue, while saving any novel ACK metadata.

The queue class may implement a function, referred to herein as "ackNext( )" to find an ACK edge (e.g., $ACK_{next}$ defined in Section 5.2), for example, as follows:

```
Q.ackNext( ) {
    curAck = top packet ACK;
    for(pkt : all packets on queue) {
        if(pkt.ack != curAck) {
            return pkt.ack;
        }
    }
    return undefined;
}
Copyright 2013 DB Networks.
```

As discussed in Section 5.2, the ackNext( ) function determines the second unique and greater acknowledgement number on the queue.

6.5. Forcing

In an embodiment, once the system determines that progress needs to be forced—e.g., via the "maybeForceProgress( )" function, called within the "driveConnection( )" function, which may determine whether or not one or more of the conditions discussed in Section 5.1 are met—progress is forced using a function, referred to herein as "forceProgress( )" which prepares a queue for a push and which may be implemented, for example, according to the following pseudocode:

```
forceProgress( ) {
    // should be trimmed for this to work
    ASS(!(Q0.ready( ) && Q1.ready( ));
    if(!Q0.ready( ) && !Q1.ready( )) {
        ASS(!both empty);
        initPushSeq = true;
        pushSyncLost( );
        return;
    }
    if(Q0.ready( ) && !Q1.ready( )) {
        Q = Q0;
        gapQ = Q1;
    } else {
        Q = Q1;
```

-continued

```
    gapQ = Q0;
  }
  ack = Q.firstPkt( ).ack( );
  gapSeq = gapQ.pushSeq;
  if(gapQ is not empty) {
    // Section 5.3.1
    if(ack > gapQ.pushSeq) {
      // Gap queue pushes first
      gapLen=min(gapQ.firstPkt( ).seq( )-gapQ.pushSeq,
        ack-gapQ.pushSeq);
      gapAck = Q.pushSeq;
    } else {
      // Ready queue pushes first
      // ACK <= gapQ.pushSeq
      ackNext = Q.ackNext(gapQ);
      firstSeqGap = gapQ.firstPkt( ).seq( );
      if(firstSeqGap.windowCheck(gapQ.pushSeq,
          gapQ.pushSeq + CAP_MAXBUF)) {
        // firstSeq after the gap is in the universe
        if(
          ackNext.defined( ) &&
          ackNext > gapQ.pushSeq &&
          ackNext < firstSeqGap) {
          gapLen = ackNext - gapQ.pushSeq;
        } else {
          gapLen = firstSeqGap - gapQ.pushSeq;
        }
      } else {
        // firstSeq after the gap is not in the universe
        if(ackNext.defined( ) && ackNext > gapQ.pushSeq) {
          gapLen = ackNext - gapQ.pushSeq;
        } else {
          gapLen = 0;
        }
      }
      gapAck = Q.endSeqFirstAck( );
    }
  } else {
    // Gap Q is empty, Section 5.3.2
    if(ack > gapQ.pushSeq) {
      gapLen = ack - gapQ.pushSeq;
      gapAck = Q.pushSeq;
    } else {
      // ACK <= gapQ.pushSeq
      ackNext = Q.ackNext(gapQ);
      if(ackNext.defined( )) {
        gapLen = ackNext-gapQ.pushSeq;
      } else {
        gapLen = 0; // ACK-only
      }
      gapAck = Q.endSeqFirstAck( );
    }
  }
  gapQ.makeGap(gapSeq, gapLen, gapAck);
}
Q.ready( ) {
  if(empty( )) {
    return false;
  }
  pkt = first packet;
  return pushSeq==pkt.Seq;
}
Copyright 2013 DB Networks.
```

As shown, the forceProgress( ) function implements the treatment of states discussed in Section 5.3 by determining the starting sequence number, length, and acknowledgement number for the gap packet, as discussed in Section 5.3, and then generating the gap packet, for example, via the "makeGap(gapSeq, gapLen, gapAck)" function of an instance of the queue class.

7. EXAMPLES

The handling of various sample cases will now be described, according to non-limiting examples.

7.1. Shorter Message Followed by Longer Response

Figure 8A:
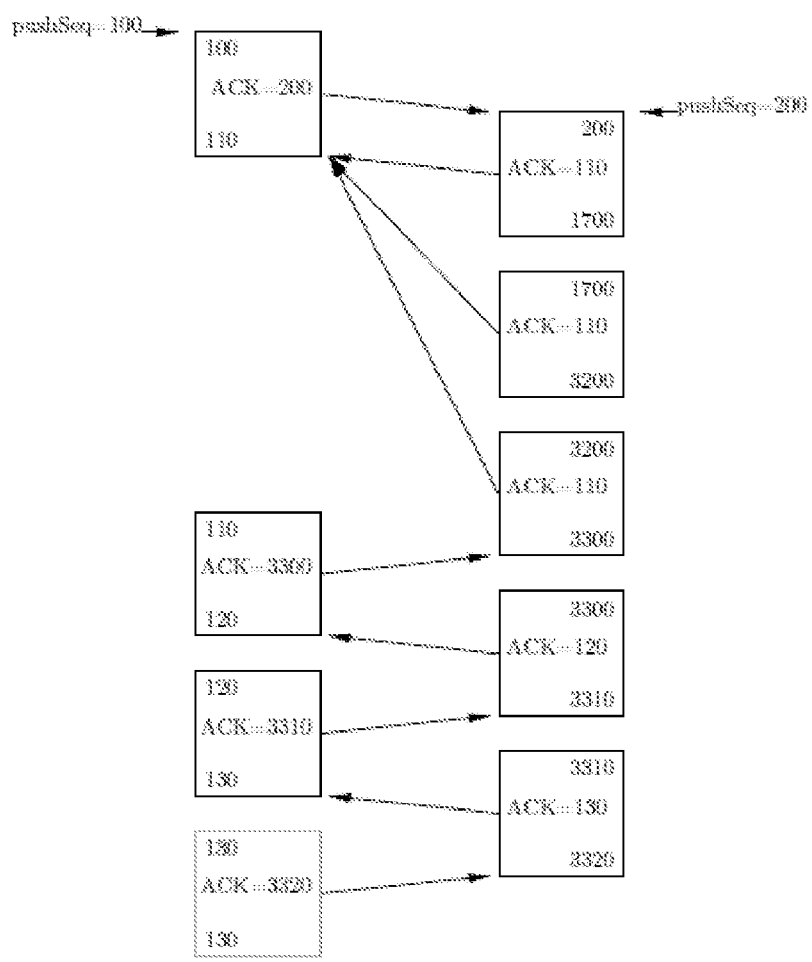
FIGS. 8A-8C illustrate queue states for non-limiting examples described herein.

FIG. 8A illustrates a sample case having a shorter message followed by a longer response, according to a non-limiting example. In an embodiment, the system would handle this case as follows:

(1) push the Q0:100-110 packet per Section 4.2.1;
(2) push the Q1:200-1700 packet per Section 4.2.2;
(3) push the Q1:1700-3200 packet per Section 4.2.2;
(4) push the Q1:3200-3300 packet per Section 4.2.2;
(5) push the Q0:110-120 packet per Section 4.2.1;
(6) push the Q1:3300-3310 packet per Section 4.2.2;
(7) push the Q0:120-130 packet per Section 4.2.1; and
(8) push the Q1:3310-3320 packet per Section 4.2.2.

The end result is that the empty ACK-only packet Q0:130-130 remains on Q0.

Figure 8B:
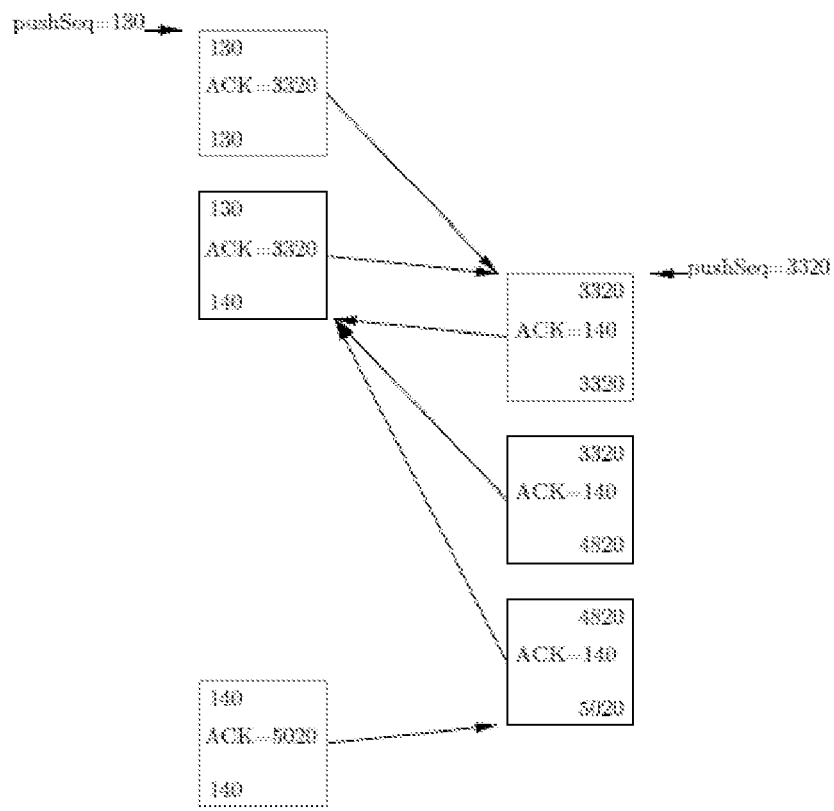

To continue this common example, assume that one more RPC turnaround occurs. FIG. 8B illustrates that RPC turnaround with the last ACK-only packet on Q0 from FIG. 8A now at the front of Q0, according to a non-limiting example. In an embodiment, the system would handle this case as follows:

(1) push the Q0:130-130 ACK-only packet per Section 4.2.1 (the push routine discards the payload, rather than sending it to the application layer);
(2) push the Q0:130-140 packet per Section 4.2.1;
(3) push the Q1:3320-3320 ACK-only packet per Section 4.2.2 (the push routine discards the payload, rather than sending it to the application layer);
(4) push the Q1:3320-4820 packet per Section 4.2.2; and
(5) push the Q1:4820-5020 packet per Section 4.2.2.

Figure 8C:
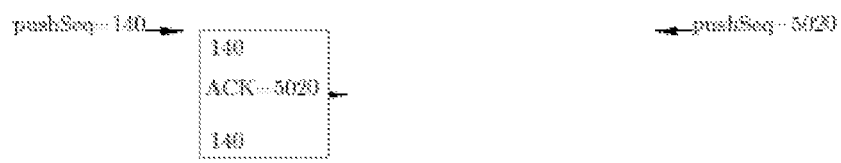

Once again, the end result is a trailing ACK-only packet Q0:140-140 on Q0, as illustrated in FIG. 8C, according to a non-limiting example. Trim processing during the next loop will remove this empty ACK-only packet before going idle.

7.2. Coalesced Data on First Pushable Packet

Figure 9:
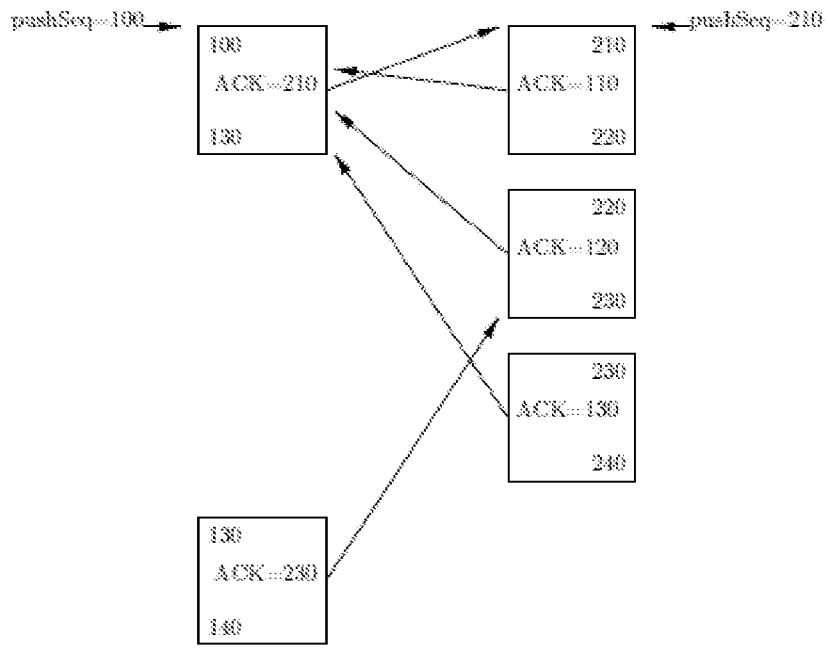
FIG. 9 illustrates a queue state in which there is coalesced data for the first pushable packet, according to a non-limiting example described herein.

FIG. 9 illustrates a case in which there is coalesced data for the first pushable packet, according to a non-limiting example. This may happen if there is old traffic floating around on a very lossy network. In an embodiment, the system would handle this case as follows:

(0) split the Q0:100-130 packet into two packets: Q0:100-110 and Q0:110-130;
(1) push the Q0:100-110 packet (first part of the split packet) per Section 4.2.1;
(2) push the Q0:110-130 packet (second part of the split packet) per Section 4.2.4;
(3) push the Q1:210-220 packet per Section 4.2.6;
(4) push the Q1:220-230 packet per Section 4.2.6; and
(5) push the Q1:230-240 packet per Section 4.2.3.

The end result is that the Q0:130-140 packet remains on Q0 waiting to get timed out via force-of-progress processing according to Q0.ACK<Q1.pushSeq. This force-of-progress processing is described in Section 5.3.2.3 (i.e., Q0 ready, Q1 empty, and ACK<pushSeq$_{gap}$). In this case, the system would insert an empty ACK-only packet on Q1 at Q1's pushSeq 240 with an ACK of 140. Finally, the system would push the Q0:130-140 packet off of Q0 per Section 4.2.1, and then trim the trailing ACK-only Q1:240-240 packet off of Q1.

7.3. Variant of Coalesced Data on First Pushable Packet

Figure 10:
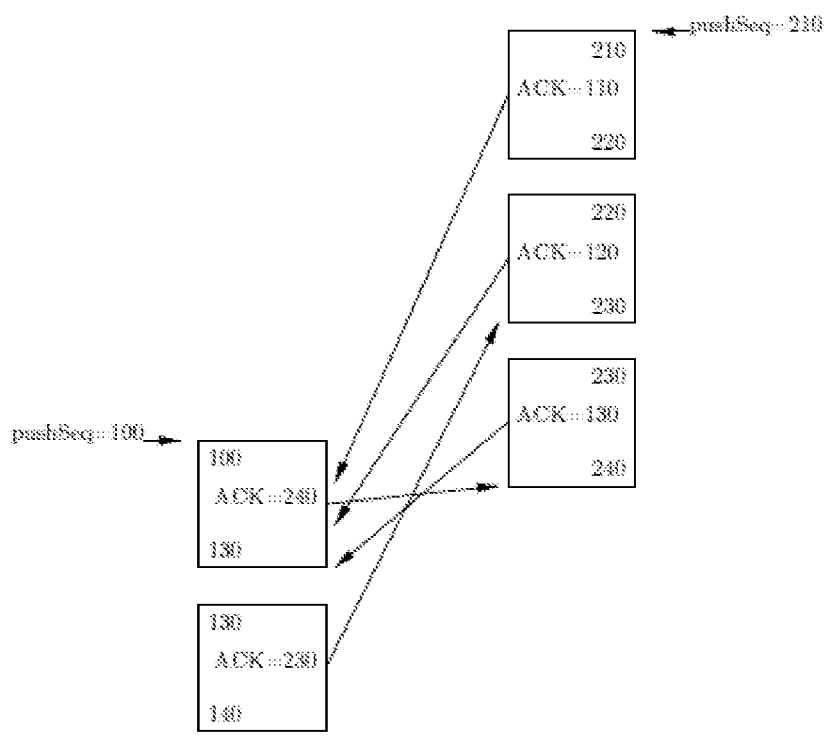
FIG. 10 illustrates a queue state in which there is coalesced data for the first pushable packet, according to a non-limiting example described herein.

FIG. 10 illustrates a more likely version of the case in which there is coalesced data for the first pushable packet than the case illustrated in FIG. 9, according to a non-limiting example. In an embodiment, the system would handle this case as follows:

(1) push the Q1:210-220 packet per the first described variation in Section 4.2.3;
(2) push the Q1:220-230 packet per the first described variation in Section 4.2.3;
(3) push the Q1:230-240 packet per the first described variation in Section 4.2.3;
(4) a timeout triggers force-of-progress processing (while a fake ACK could also be created to keep things moving forward, as described in Section 4.2.3, without capture loss there will be an extra ACK to keep things moving, so this is likely "gilding the lily;" thus, a timeout and/or gap packet could be used here, but there is likely no reason to do both);
(5) per Section 5.3.2.2, the gap is pushed first, and a zero-length ACK-only packet is inserted into Q1 at pushSeq 240 with an ACK of 130;
(6) push the Q0:100-130 packet per Section 4.2.1;
(7) with no progress in the normal section, progress is again forced because no new traffic is received;
(8) per Section 5.3.2.2, the gap is pushed first, and a zero-length ACK-only packet is inserted into Q1 at pushSeq 240 with an ACK of 140; and
(9) push the Q0:130-140 packet per Section 4.2.1.

7.4. Streaming Followed by Coalesced Retransmitted Data

Figure 11:
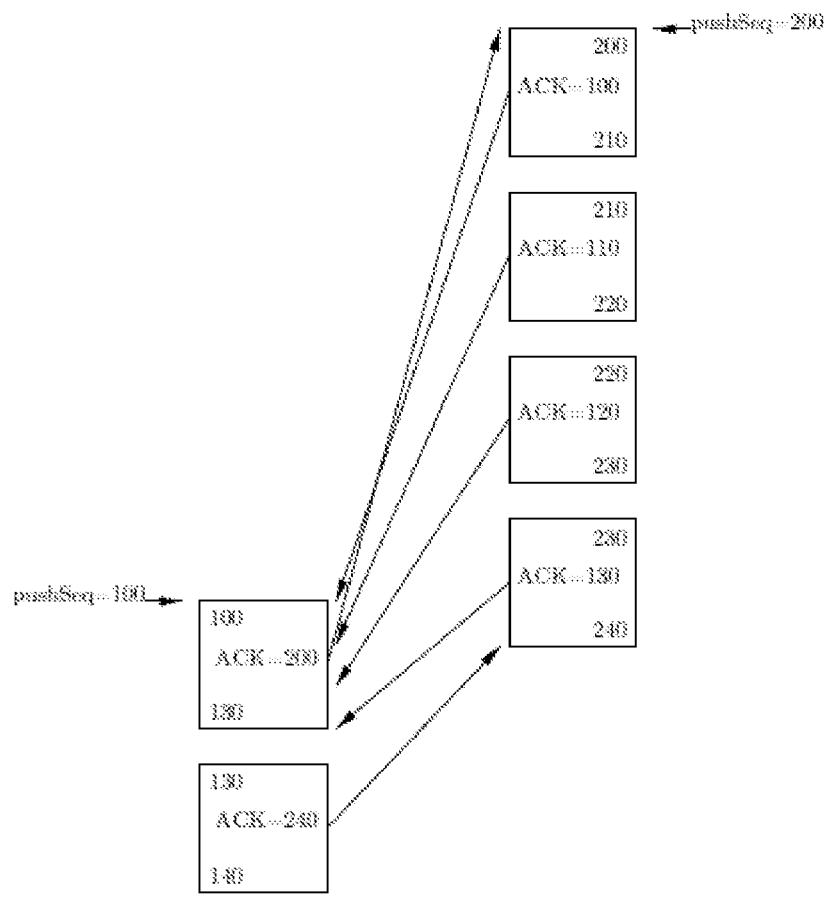
FIG. 11 illustrates a queue state in which streaming is followed by coalesced retransmitted data, according to a non-limiting example described herein.

FIG. 11 illustrates a case in which streaming is followed by coalesced retransmitted data, according to a non-limiting example. In an embodiment, the system would handle this case as follows:

(1) push the Q1:200-210 packet per the first described variation in Section 4.2.3;
(2) split top packet Q0:100-130 into Q0:100-110 and Q0:110-130, and push the Q0:100-110 packet per Section 4.2.7;
(3) push the Q1:210-220 packet per the first described variation in Section 4.2.3;
(4) split top packet Q0:110-130 into Q0:110-120 and Q0:120-130, and push the Q0:110-120 packet per Section 4.2.7, resulting in a state in which Q0.ACK (200)<Q1.pushSeq (220) && Q1.ACK (120)==Q0.pushSeq (120);
(5) push the Q1:220-230 packet per the first described variation in Section 4.2.4, resulting in a state in which Q0.ACK (200)<Q1.pushSeq (230) && Q1.ACK (130)>Q0.pushSeq (120);
(6) push the Q0:120-130 packet per Section 4.2.7, consuming the last of the top packet in Q0, and resulting in a state in which Q0.ACK (240)>Q1.pushSeq (230) && Q1.ACK (130)==Q0.pushSeq (130);
(7) push the Q1:230-240 packet per Section 4.2.2, resulting in a state in which Q0.ACK (240)==Q1.pushSeq (240) && Q1.ACK NA, Q0.pushSeq(130);
(8) a timeout triggers force-of-progress processing;
(9) per Section 5.3.2 (Q0 is ready and Q1 has a gap), insert a zero-length ACK-only packet on Q1 with SEQ 240 and an ACK 140 to free Q1;
(10) push the Q1:130-140 packet per Section 4.2.1; and
(11) clean up the ACK-only packet Q1:240-240 on Q1 via trim processing.

7.5. Q0 ACK Is in the Past

Figure 12:
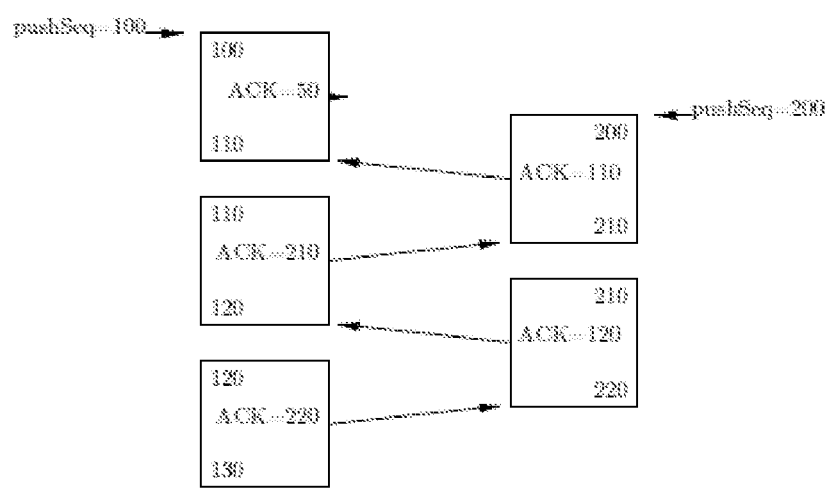
FIG. 12 illustrates a queue state in which one queue acknowledgement is in the past, according to a non-limiting example described herein.

FIG. 12 illustrates a case in which the Q0 ACK is in the past, according to a non-limiting example. In an embodiment, the system would handle this case as follows:

(1) push the Q0:100-110 packet per Section 4.2.7;
(2) push the Q1:200-210 packet per Section 4.2.2; and
(3) so forth.

7.6. Q0 ACK Is in the Future

Figure 13:
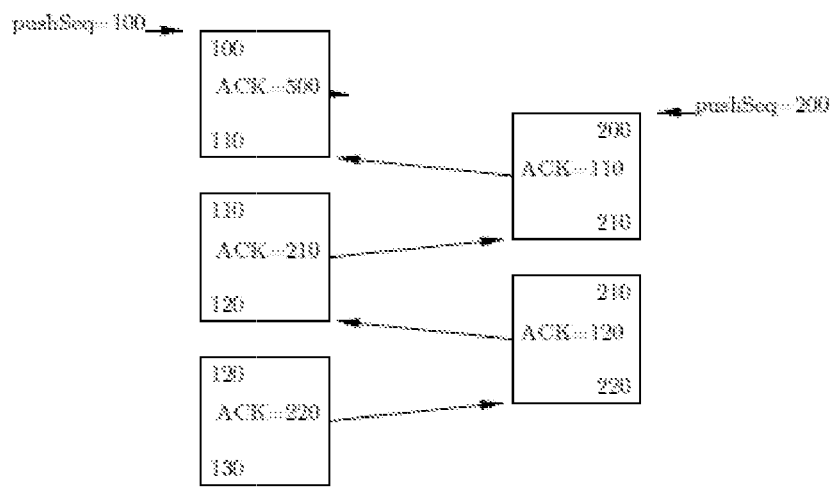
FIG. 13 illustrates a queue state in which one queue acknowledgement is in the future, according to a non-limiting example described herein.

FIG. 13 illustrates a case in which the Q0 ACK is in the future, according to a non-limiting example. In an embodiment, the system would handle this case as follows:

(1) push the Q0:100-110 packet per Section 4.2.9;
(2) push the Q1:200-210 packet per Section 4.2.2; and
(3) so forth.

7.7. Streams Crossed in the Future

Figure 14:
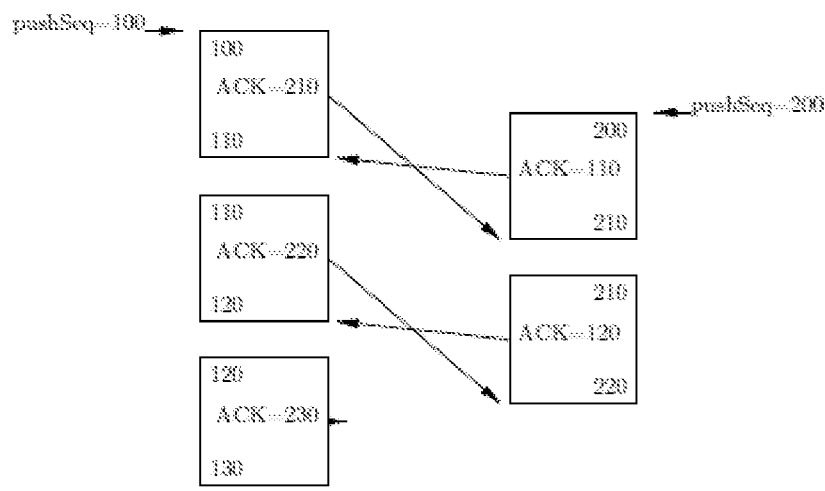
FIG. 14 illustrates a queue state in which streams are crossed in the future, according to a non-limiting example described herein.

FIG. 14 illustrates a case in which streams are crossed in the future, according to a non-limiting example. This should not happen naturally in a real network, but it could be constructed. Regardless of its likelihood, this case can be treated like a normal streaming case in which causality is preserved. Thus, in an embodiment, the system would handle this case as follows:

(1) push the Q0:100-110 packet per Section 4.2.9, resulting in a state in which Q0.ACK (220)>Q1.pushSeq (200) && Q1.ACK (110)==Q0.pushSeq (110);
(2) push the Q1:200-210 packet per Section 4.2.2; and
(3) so forth.

7.8. Two Unidirectional Streams

Figure 15:
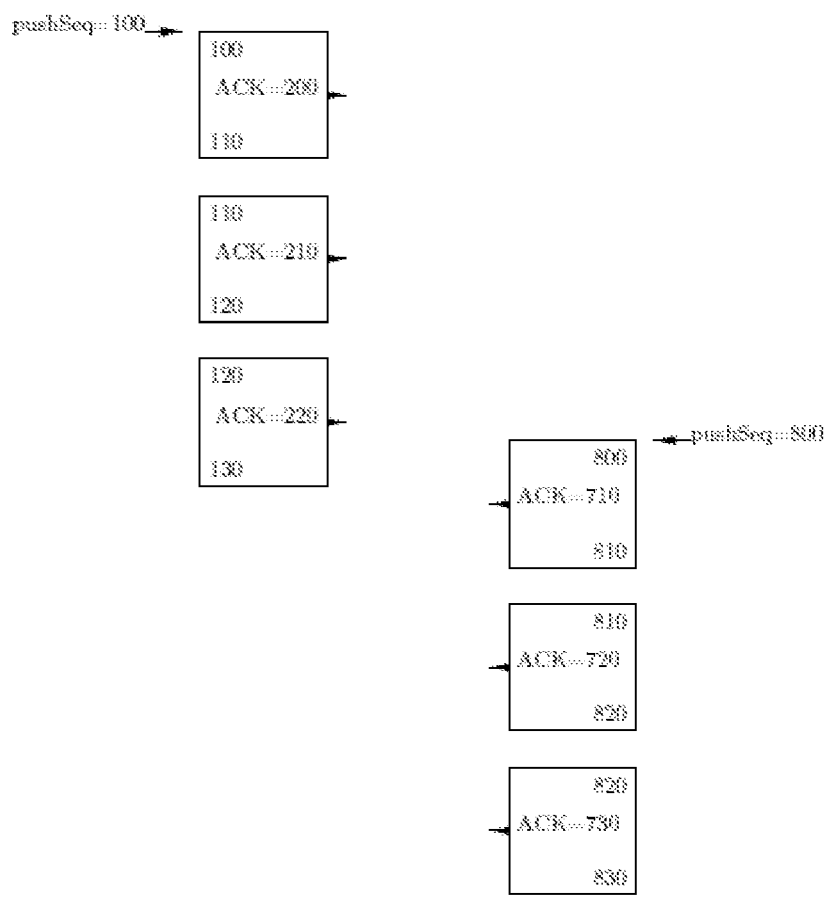
FIG. 15 illustrates a queue state in which there are two unidirectional streams, according to a non-limiting example described herein.

FIG. 15 illustrates a case in which there are two unidirectional streams, according to a non-limiting example. This assumes that the packets in the "800" region are out of window compared to the packets in the "100" region. Before the first push attempt, the system may perform a multi-universe check, as described in Section 3, to determine that each queue's ACK is out of window with respect to the opposing queue's pushSeq. In an embodiment, the system would handle this case as follows:

(1) choose Q0 as the current queue to be processed, based on the timestamp of the Q0:100-110 packet, such that Q0's pushSeq is kept at 100, and Q1's pushSeq is set to 200;
(2) since no progress is possible because Q1 is not ready, wait for a force-of-progress state of Q0.ACK=200, Q1.pushSeq=200, Q1 has a gap, and Q0.pushSeq=100;
(3) create a gap packet per Section 5.3.1.2 with SEQ=pushSeq$_{gap}$ (200), LEN=10, and ACK=110, resulting in a state of Q0.ACK (200)==Q1.pushSeq (200) && Q1.ACK (110)>Q0.pushSeq (100);
(4) push the Q0:100-110 packet per Section 4.2.1, resulting in a state of Q0.ACK (210)>Q1.pushSeq (200) && Q1.ACK (110)==Q0.pushSeq (110);
(5) push the Q1:200-210 gap packet per Section 4.2.2, resulting in a state of Q0.ACK (210)==Q1.pushSeq (210) && gap on Q1, Q0.pushSeq (110);
(6) force progress to fill in the missing packet on Q1;
(7) create a gap packet per Section 5.3.1.2 with SEQ=pushSeq$_{gap}$ (210), LEN=10, and ACK=120, resulting in a state of Q0.ACK (210)==Q1.pushSeq (210) && Q1.ACK (120)>Q0.pushSeq (110);
(8) push the Q0:110-120 packet per Section 4.2.1, resulting in a state of Q0.ACK (220)>Q1.pushSeq (210) && Q1.ACK (120)==Q0.pushSeq (120);
(9) push the Q1:210-220 gap packet per Section 4.2.2, resulting in a state of Q0.ACK (220)==Q1.pushSeq (220) && gap on Q1, Q0.pushSeq (120);
(10) force progress to fill in the missing packet on Q1;

(11) create an ACK-only gap packet per Section 5.3.1.2 with SEQ=pushSeq$_{gap}$ (220), LEN=0, and ACK=130, resulting in a state of Q0.ACK (220)==Q1.pushSeq (220) && Q1.ACK (130)>Q0.pushSeq (120);

(12) push the Q0:120-130 packet per Section 4.2.1, resulting in a state of Q0 is empty and Q1 is ready;

(13) clear the ACK-only Q1:220-220 from Q1, resulting in a pre-push attempt state of Q0 is empty and Q1 has a gap;

(14) since the pushSeqCheck( ) function determines that the queues are out of window, send a connection re-sync, resulting in a state of Q0.pushSeq=710 and Q1.pushSeq=800;

(15) create a gap packet per Section 5.3.2.2 with SEQ=710, LEN=10, and ACK=810, resulting in a state of Q0.ACK (810)>Q1.pushSeq (800) && Q1.ACK (710)==Q0.pushSeq (710);

(16) push the Q1:800-810 packet per Section 4.2.2; and

(17) so forth as the unidirectional drain continues.

7.9. Gap on Longer Message

Figure 16:
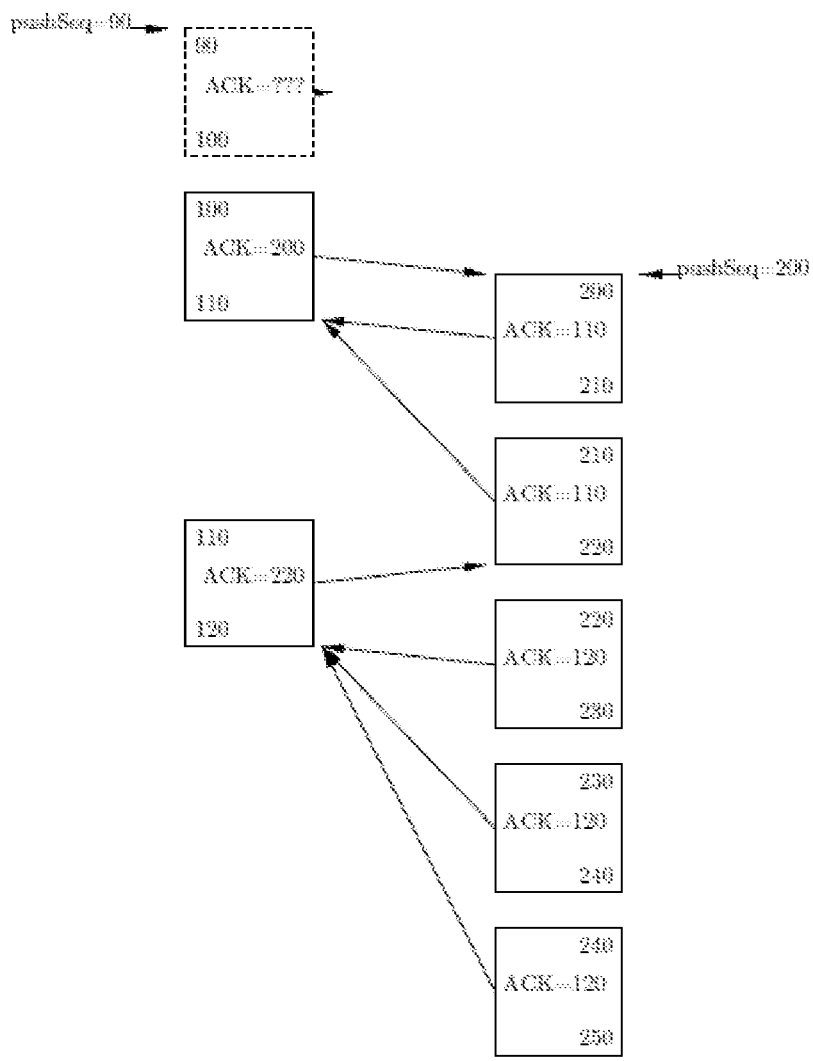
FIG. 16 illustrates a queue state in which there is a gap within a longer message, according to a non-limiting example described herein.

FIG. 16 illustrates a case in which there is a gap within a longer message, according to a non-limiting example. In an embodiment, the system would handle this case as follows:

(1) force progress, and create a gap packet per Section 5.3.1.1 with SEQ=90, LEN=10, and ACK=200;

(2) push the Q0:90-100 gap packet per Section 4.2.1;

(3) push the Q0:100-110 packet per Section 4.2.1;

(4) push the Q1:200-210 packet per Section 4.2.2;

(5) push the Q1:210-220 packet per Section 4.2.2;

(6) push the Q0:110-120 packet per Section 4.2.1, leaving the final message in three packets on Q1, but no ACK on Q0 to release it;

(7) force progress, and create an ACK-only gap packet on Q0 per Section 5.3.2.2 with SEQ=120, LEN=0, and ACK=250;

(8) push the Q1:220-230 packet per Section 4.2.2;

(9) push the Q1:230-240 packet per Section 4.2.2;

(10) push the Q1:240-250 packet per Section 4.2.2; and

(11) clean up the empty ACK-only Q0:120-120 packet on Q0 via trim processing.

8. DEBUGGING AND TRACING

In an embodiment of a database firewall—e.g., as disclosed in the '579 Application—supported by the disclosed algorithms and processes of the disclosed system, detailed debugging information is provided on a per connection basis.

8.1. Trace Buffer

In an embodiment, each TCP connection processed by the system is associated with a trace buffer. The trace buffer may be a contiguous memory region containing a set of variable-length records containing various types of trace information. Aside from static strings (messages in source), the data in the trace entries are copied from their source locations when the trace record is created.

The trace records in the trace buffer may be linked into a linked list. Once the buffer is full, the oldest records may be overwritten with new ones. Thus, the buffer holds as many of the most recent trace records as fit within the trace buffer.

8.2. Trace Records

In an embodiment, all trace records have a high-resolution timestamp that is copied from the CPU's time stamp counter when the record is created. In an embodiment, each trace record may be according to one of the following record types:

(1) Head: such a record carries no payload other than the timestamp. It is written once when the connection is created. It is useful for determining whether or not the trace buffer has wrapped since the connection was created.

(2) Message: such a record comprises a debugging printf-style text message with parameters.

(3) Packet: such a record comprises the details of a packet in core (e.g., sequence number, acknowledgement number, data, etc.), along with a text message included at the trace point in the code.

(4) Queue: such a record represents a snapshot of the state of the two connection packet queues and pushSeq values when created. A summary of a certain number of packets (e.g., up to the first sixteen packets) or all of the packets in each connection queue may be included in the record. This can be useful to determine how the system manages the queues over a connection's lifetime.

8.2. Trace Control Mask

In an embodiment, each trace entry supplies a mask word. The mask word may be AND'ed with a connection's current trace mask setting to determine if the trace entry should be recorded (e.g., stored in the trace buffer) or discarded.

When a connection is created, the trace control mask for the connection is copied from a global trace control mask that is determined by a filter, referred to herein as the "traceMaskFilter." Two values are possible: one that is used when the traceMaskFilter matches the connection, and one that is used when it does not. The defaults are to trace all categories of debug messages (0xffff) (e.g., errors, warnings, information, details, etc.) if the traceMaskFilter matches the connection, and to trace nothing (0x0000) if the mask does not match the connection. Accordingly, in an embodiment, a user can specify which connections he or she wishes to trace, and the system will set the trace mask to gather detailed trace data.

8.4. Trace Buffer Size

In an embodiment, the trace buffer for a connection is allocated when the connection is created. It may be one of two sizes based on a trace size filter, referred to herein as the "traceSizeFilter." The default sizes may be one megabyte if the traceSizeFilter matches an attribute of the connection (e.g., the IP addresses and TCP ports that define the connection), and zero bytes if the traceSizeFilter does not match the attribute of the connection. In other words, if the traceSizeFilter does not match for the connection, trace records are not stored for the connection.

8.5. Filters

In an embodiment, the system may utilize a number of connection-matching filters. A filter may contain a match value and mask for both IP addresses and TCP ports that define the connection, as well as the realm.

When a connection is evaluated against a filter, the mask is applied with a logical AND operation to all values being compared. Then, the values are compared to those stored in the filter. For example, if the filter had a host value of 134.195.0.0:1521 and a mask of 255.255.0.0:65535, any connection in the 134.195 subnet on port 1521 would match.

There may be two host/port tuples in each filter. Each of the two host/port tuples in the filter is for matching a different side of the connection. Using wildcard entries (e.g., "0") in parts of one or both of the per-host tuples allows flexibility in the filters. For example, the tuples may define a specific connection, all connections for a given server port, or all connections between a given client and server.

In an embodiment, a filter is specified via a text filter string. All elements of the filter may default to "0," resulting in a full wildcard match to any connection. Specified elements (e.g., user-specified values) override the default elements. A filter may comprise, for example, the following elements:

(1) h0: an endpoint tuple, which may be specified as an IP address in dotted quad notation, followed by a colon and a port number from 0 to 65535 (e.g., 134.195.0.0:1521).

(2) h1: the other endpoint tuple for a connection, having the same syntax as h0.

(3) realm: the realm number for a connection.

(4) host_mask: a tuple that provides the pre-match mask, having the same syntax as h0.

(5) realm_mask: a mask applied to the realm before matching.

8.6. Extracting Trace Data from the Engine

Triggers for when the system may "dump" a trace buffer of trace records for one or more connections into a file (e.g., for review and debugging) will now be described. The file may be saved to a system-specified or user-specified TCP dump directory. Many of the triggers described in this section utilize filters, each of which may comprise the elements described in Section 8.5.

8.6.1. Automatic Dump on Connection Close

In an embodiment, when a connection matches a dump-on-close filter, referred to herein as "dumpOnClose," a file is created in the TCP dump directory when the connection-close condition is detected on the matching connection (i.e., when it is detected that the connection has been closed).

8.6.2. Dump on Snapshot

In an embodiment, when a snapshot is requested (e.g., manually via a "snapshot" command or user interface provided by the system), a dump is written for each connection matching a dump-on-snap filter, referred to herein as "dumpOnSnap."

8.6.3. Dump on Snap Active

In an embodiment, when an active-connections snapshot is requested (e.g., manually via a "snapshot-active" command or user interface provided by the system), a dump is written for each active connection that matches a dump-on-snap-active filter, referred to herein as "dumpOnSnapActive."

8.6.4. Dump on Snap on Stack

In an embodiment, when an active-connections snapshot is called for (e.g., manually via a "snapshot-active" command or user interface provided by the system, or during a panic), a dump is written for each active connection on a CPU stack that matches a dump-on-snap-on-stack filter, referred to herein as "dumpOnSnapOnStack."

8.6.5. Display Filter

In an embodiment, a connections display in a user interface provided by the system may be filtered via a display filter.

8.7. Displaying Trace Data

In an embodiment, the trace records for each connection are written to separate files (i.e., one file per connection) named with the connection tuple in a TCP trace directory. The text dump of the trace record may be stored in JavaScript Object Notation (JSON) format in a current dump file. The user interface may include a trace formatter that allows display of the current dump file or a saved dump file from an earlier run, which may be in JSON format, for example, via a customer service mode accessed via one or more navigable menus in a user interface provided by the system.

8.8. Registry

In an embodiment, the following registry entries initialize the global configuration of the system at start-up time:

/tcpv2/dumpOnCloseFilter—connections matching this filter will dump when they attain a "closed" status (e.g., due to finish (FIN), reset (RST), or end-of-file (EOF) bits or indications in the capture source). By default, all connections may be matched.

/tcpv2/dumpOnSnapFilter—connections matching this filter will dump when a snapshot is called for (e.g., manually). By default, all connections may be matched.

/tcpv2/dumpOnSnapActiveFilter—connections matching this filter will dump when an active-connections snapshot is called for (e.g., manually). Active connections are those that are currently scheduled for CPU service (i.e., packets are on their queues). By default, all connections may be matched.

/tcpv2/dumpOnSnapOnStackFilter—connections matching this filter will dump when an on-stack snapshot is called for (e.g., manually or during a panic). On-stack connections are those that are actively being serviced by a CPU thread. By default, all connections may be matched.

/tcpv2/traceMaskFilter—this filter determines with which trace mask a connection will be initialized.

/tcpv2/TRACE_MASK_MATCH—when a connection matches the traceMaskFilter, this mask is used for the connection. The bits in the mask may be:

0x0001 PKT
0x0002 PKTV
0x0004 Q
0x0008 FLOW
0x0010 FLOWV
0x0020 QV

The default is 0xffff

/tcpv2/TRACE_MASK_NOMATCH—when a connection does not match the traceMaskFilter, this mask is used for the connection. The default is 0x0.

/tcpv2/traceSizeFilter—this filter determines which trace size is used.

/tcpv2/TRACE_SIZE_MATCH—when a new connection matches the traceSizeFilter, this size (e.g., in bytes) is used for the trace buffer. By default, the size may be one megabyte.

/tcpv2/TRACE_SIZE_NOMATCH—when a new connection does not match the traceSizeFilter, this size (e.g., in bytes) is used for the trace buffer. By default, the size may be zero bytes, which disables tracing for the connection.

/tcpv2/DUMP_FILE_PATH—this is the leading path to the trace dump directory. This path may be created if needed (e.g., with "mkdir-p"). By default, the path may be "./tcp/" or some other default directory.

8.9. Real Time

In an embodiment, one or more of the described settings for the system may be changed at runtime, e.g., via a Tool Command Language (TCL) command (e.g., a ::tcpv2::filter TCL command). If no arguments are given, all current filter settings may be dumped or displayed.

If a filter name (e.g., dumpOnClose, dumpOnSnap, dumpOnSnapActive, dumpOnSnapOnStack, traceMask, traceSize, or display) is given, the second argument may contain the filter string (e.g., in zero or more token/value pairs, all whitespace separated, such as "h0 134.195.0.0:1521 h1 10.0.0.1:0") to be used as the filter.

If a mask name (e.g., TRACE_MASK_MATCH, TRACE_MASK_NOMATCH, TRACE_SIZE_MATCH, TRACE_SIZE_NOMATCH) is given, the value provided will set the mask for all new connections opened after the command is issued.

9. EXAMPLE PROCESSING DEVICE

Figure 17:
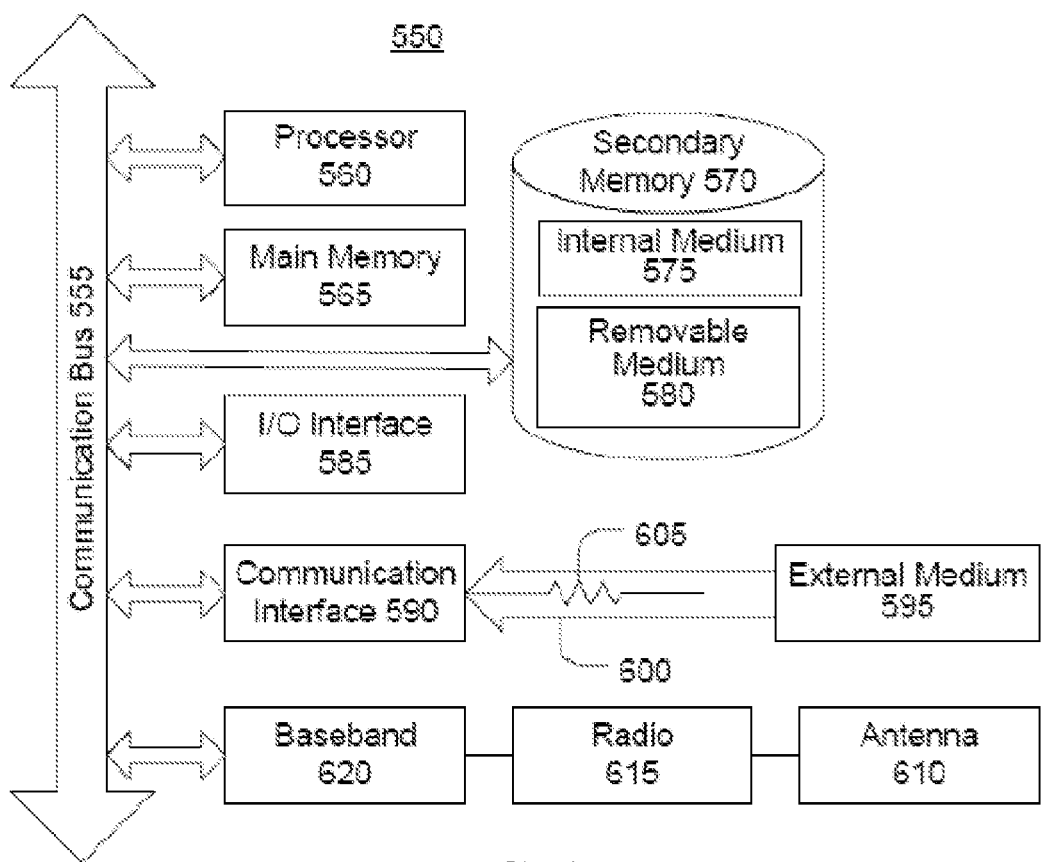
FIG. 17 illustrates a processing system on which one or more of the processes described herein may be executed, according to an embodiment.

FIG. 17 is a block diagram illustrating an example wired or wireless system 550 that may be used in connection with various embodiments described herein, including as the system described herein. For example, the system 550 may be used as or in conjunction with (e.g., to execute) one or more of the mechanisms, processes, methods, algorithms, or functions described above (e.g., to store the disclosed queues and/or execute the disclosed queue processing). The system 550 can be a server or any conventional personal computer, or any other processor-enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560. Examples of processors which may be used with system 550 include, without limitation, the Pentium® processor, Core i7® processor, and Xeon® processor, all of which are available from Intel Corporation of Santa Clara, Calif.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 550 preferably includes a main memory 565 and may also include a secondary memory 570. The main memory 565 provides storage of instructions and data for programs executing on the processor 560, such as one or more of the functions and/or modules discussed above. It should be understood that programs stored in the memory and executed by processor 560 may be written and/or compiled according to any suitable language, including without limitation C/C++, Java, JavaScript, Perl, Visual Basic, .NET, and the like. The main memory 565 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 570 may optionally include an internal memory 575 and/or a removable medium 580, for example a floppy disk drive, a magnetic tape drive, a compact disc (CD) drive, a digital versatile disc (DVD) drive, other optical drive, a flash memory drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer-readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory (PROM), erasable programmable read-only memory (EPROM), electrically erasable read-only memory (EEPROM), or flash memory (block-oriented memory similar to EEPROM). Also included are any other removable storage media 580 and communication interface 590, which allow software and data to be transferred from an external medium 595 to the system 550.

System 550 may include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device.

Communication interface 590 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software, such as the disclosed application) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

In an embodiment, I/O interface 585 provides an interface between one or more components of system 550 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 550 also includes optional wireless communication components that facilitate wireless communication over a voice and over a data network. The wireless communication components comprise an antenna system 610, a radio system 615 and a baseband system 620. In the system 550, radio frequency (RF) signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA, or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A system comprising:
   at least one hardware processor; and
   one or more software modules that, when executed by the at least one hardware processor,
   receive a plurality of data packets from a network tap on a network connection between two network agents, wherein each of the plurality of data packets comprise a starting sequence number and an acknowledgement number,
   separate the plurality of data packets into two queues based on a direction of communication for each data packet, wherein each of the two queues represents a different direction of communication,
   for each of the two queues, maintain a push-sequence value for the queue, wherein each push-sequence value represents a starting sequence number of a packet that must be pushed off its respective queue next in order to maintain a consecutive sequence number order for packets pushed off its respective queue,
   when both of the push-sequence values are equal to the starting sequence number of a first data packet on their respective queues,
      if the acknowledgement number of the first data packet on one of the two queues is greater than the push-sequence value for the other of the two queues and the acknowledgement number of the first data packet on the other queue is less than or equal to the push-sequence value for the one queue, push, to an output, an amount of data off of the other queue that is equal to a minimum of a length of the first data packet on the other queue and a difference between the acknowledgement number of the first data packet on the one queue and the push-sequence value for the other queue, and,
      otherwise,
         identify a first one of the two queues whose first data packet has an earlier timestamp than the first data packet on a second one of the two queues,
         determine whether or not a next acknowledgement number in a data packet exists on the second queue that is greater than a preceding acknowledgement number in a preceding data packet on the second queue, wherein the preceding acknowledgement number is greater than the push-sequence value for the first queue,
         if the next acknowledgement number is determined to exist on the second queue, push, to the output, an amount of data off of the first queue that is equal to the difference between the next acknowledgement number and the push-sequence value for the first queue,
         if the next acknowledgement number is not determined to exist on the second queue, push, to the output, the first data packet on the first queue, and
         provide the output to an application layer, and
   when at least one of the push-sequence values is not equal to the starting sequence number of the first data packet on its respective queue and a forcing condition is met, generate at least one gap packet for at least one of the two queues.

2. The system of claim 1, wherein generating at least one gap packet comprises, when the push-sequence value for a first one of the two queues is equal to the starting sequence number of a first data packet on the first queue and the push-sequence value for a second one of the two queues is not equal to the starting sequence number of a first data packet on the second queue:
   if the second queue is not empty and the acknowledgement number of the first data packet on the first queue is greater than the push-sequence value for the second queue, generate the gap packet to have a starting sequence number equal to the push-sequence value for the second queue, an acknowledgement number equal to the push-sequence value of the first queue, and a length equal to a minimum of a difference between a starting sequence number of the first data packet on the second queue and the push-sequence value for the second queue and a difference between the acknowledgement number of the first data packet on the first queue and the push-sequence value for the second queue;

if the second queue is not empty and the acknowledgement number of the first data packet on the first queue is not greater than the push-sequence value for the second queue,
  determine whether or not a next acknowledgement number in a data packet exists on the first queue that is greater than a preceding acknowledgement number in a preceding data packet on the first queue, wherein the preceding acknowledgement number is greater than the push-sequence value for the second queue,
  determine an ending sequence number for a last contiguous data packet on the first queue that comprises the acknowledgement number of the first data packet on the first queue,
  if the sequence number of the first data packet on the second queue is within a predetermined range of the push-sequence value for the second queue, the next acknowledgement number is determined to exist on the first queue, the next acknowledgement number is greater than the push-sequence value for the second queue, and the next acknowledgement number is less than the sequence number of the first data packet on the second queue, generate the gap packet to have a starting sequence number equal to the push-sequence value for the second queue, an acknowledgement number equal to the determined ending sequence number, and a length equal to a difference between the next acknowledgement number and the push-sequence value for the first queue,
  if the sequence number of the first data packet on the second queue is within a predetermined range of the push-sequence value for the second queue and either the next acknowledgement number is not determined to exist on the first queue, the next acknowledgement number is not greater than the push-sequence value for the second queue, or the next acknowledgement number is not less than the sequence number of the first data packet on the second queue, generate the gap packet to have a starting sequence number equal to the push-sequence value for the second queue, an acknowledgement number equal to the determined ending sequence number, and a length equal to a difference between the sequence number of the first data packet on the second queue and the push-sequence value for the first queue,
  if the sequence number of the first data packet on the second queue is not within a predetermined range of the push-sequence value for the second queue, the next acknowledgement number is determined to exist on the first queue, and the next acknowledgement number is greater than the push-sequence value for the second queue,
    generate the gap packet to have a starting sequence number equal to the push-sequence value for the second queue, an acknowledgement number equal to the determined ending sequence number, and a length equal to a difference between the next acknowledgement number and the push-sequence value for the second queue, and,
  if the sequence number of the first data packet on the second queue is not within a predetermined range of the push-sequence value for the second queue and either the next acknowledgement number is not determined to exist on the first queue or the next acknowledgement number is not greater than the push-sequence value for the second queue, generate the gap packet to have a starting sequence number equal to the push-sequence value for the second queue, an acknowledgement number equal to the determined ending sequence number, and a length equal to zero;

if the second queue is empty and the acknowledgement number of the first data packet on the first queue is greater than the push-sequence value for the second queue, generate the gap packet to have a starting sequence number equal to the push-value sequence for the second queue, an acknowledgement number equal to the push-sequence value for the first queue, and a length equal to a difference between the acknowledgement number of the first data packet on the first queue and the push-sequence value for the second queue; and, if the second queue is empty and the acknowledgement number of the first data packet on the first queue is not greater than the push-sequence value for the second queue,
  determine whether or not a next acknowledgement number in a data packet exists on the first queue that is greater than a preceding acknowledgement number in a preceding data packet on the first queue, wherein the preceding acknowledgement number is greater than the push-sequence value for the second queue,
  determine an ending sequence number for a last contiguous data packet on the first queue that comprises the acknowledgement number of the first data packet on the first queue,
  if the next acknowledgement number is determined to exist, generate the gap packet to have a starting sequence number equal to the push-sequence value for the second queue, an acknowledgement number equal to the determined ending sequence number, and a length equal to a difference between the next acknowledgement number and the push-sequence value for the second queue, and,
  if the next acknowledgement number is not determined to exist, generate the gap packet to have a starting sequence number equal to the push-sequence value for the second queue, an acknowledgement number equal to the determined ending sequence number, and a length equal to zero.

3. The system of claim 1, wherein maintaining the push-sequence values for the two queues comprises initializing the push-sequence values when the push-sequence value for one queue is outside a predetermined range from the acknowledgement value of a first data packet on the other one of the two queues.

4. The system of claim 3, wherein initializing the push-sequence values comprises:
  identifying a first one of the two queues whose first data packet has an earlier timestamp than the first data packet on a second one of the two queues;

setting the push-sequence value for the first queue to the sequence number of the first data packet on the first queue; and setting the push-sequence value for the second queue to the acknowledgement number of the first data packet on the first queue.

5. The system of claim 1, wherein the forcing condition comprises an elapse of a predetermined time during which no new data packets have been received from the network tap.

6. The system of claim 1, wherein the forcing condition comprises a number of data packets on one or both of the two queues exceeding a predetermined threshold.

7. The system of claim 1, wherein the forcing condition comprises a detection that the network connection between the two network agents has been closed.

8. A method comprising using at least one hardware processor to:

receive a plurality of data packets from a network tap on a network connection between two network agents, wherein each of the plurality of data packets comprise a starting sequence number and an acknowledgement number;

separate the plurality of data packets into two queues based on a direction of communication for each data packet, wherein each of the two queues represents a different direction of communication;

for each of the two queues, maintain a push-sequence value for the queue, wherein each push-sequence value represents a starting sequence number of a packet that must be pushed off its respective queue next in order to maintain a consecutive sequence number order for packets pushed off its respective queue;

when both of the push-sequence values are equal to the starting sequence number of a first data packet on their respective queues, if the acknowledgement number of the first data packet on one of the two queues is greater than the push-sequence value for the other of the two queues and the acknowledgement number of the first data packet on the other queue is less than or equal to the push-sequence value for the one queue, push, to an output, an amount of data off of the other queue that is equal to a minimum of a length of the first data packet on the other queue and a difference between the acknowledgement number of the first data packet on the one queue and the push-sequence value for the other queue, and, otherwise,
identify a first one of the two queues whose first data packet has an earlier timestamp than the first data packet on a second one of the two queues, determine whether or not a next acknowledgement number in a data packet exists on the second queue that is greater than a preceding acknowledgement number in a preceding data packet on the second queue, wherein the preceding acknowledgement number is greater than the push-sequence value for the first queue, if the next acknowledgement number is determined to exist on the second queue, push, to the output, an amount of data off of the first queue that is equal to the difference between the next acknowledgement number and the push-sequence value for the first queue, if the next acknowledgement number is not determined to exist on the second queue, push, to the output, the first data packet on the first queue, and provide the output to an application layer; and when at least one of the push-sequence values is not equal to the starting sequence number of the first data packet on its respective queue and a forcing condition is met, generate at least one gap packet for at least one of the two queues.

9. The method of claim 8, wherein generating at least one gap packet comprises, when the push-sequence value for a first one of the two queues is equal to the starting sequence number of a first data packet on the first queue and the push-sequence value for a second one of the two queues is not equal to the starting sequence number of a first data packet on the second queue:

if the second queue is not empty and the acknowledgement number of the first data packet on the first queue is greater than the push-sequence value for the second queue, generate the gap packet to have a starting sequence number equal to the push-sequence value for the second queue, an acknowledgement number equal to the push-sequence value of the first queue, and a length equal to a minimum of a difference between a starting sequence number of the first data packet on the second queue and the push-sequence value for the second queue and a difference between the acknowledgement number of the first data packet on the first queue and the push-sequence value for the second queue;

if the second queue is not empty and the acknowledgement number of the first data packet on the first queue is not greater than the push-sequence value for the second queue, determine whether or not a next acknowledgement number in a data packet exists on the first queue that is greater than a preceding acknowledgement number in a preceding data packet on the first queue, wherein the preceding acknowledgement number is greater than the push-sequence value for the second queue, determine an ending sequence number for a last contiguous data packet on the first queue that comprises the acknowledgement number of the first data packet on the first queue, if the sequence number of the first data packet on the second queue is within a predetermined range of the push-sequence value for the second queue, the next acknowledgement number is determined to exist on the first queue, the next acknowledgement number is greater than the push-sequence value for the second queue, and the next acknowledgement number is less than the sequence number of the first data packet on the second queue, generate the gap packet to have a starting sequence number equal to the push-sequence value for the second queue, an acknowledgement number equal to the determined ending sequence number, and a length equal to a difference between the next acknowledgement number and the push-sequence value for the first queue, if the sequence number of the first data packet on the second queue is within a predetermined range of the push-sequence value for the second queue and either the next acknowledgement number is not determined to exist on the first queue, the next acknowledgement number is not greater than the push-sequence value for the second queue, or the next acknowledgement number is not less than the sequence number of the first data packet on the second queue, generate the gap packet to have a starting sequence number equal to the push-sequence value for the second queue, an acknowledgement number equal to the determined ending sequence number, and a length equal to a difference between the sequence number of the first data packet on the second queue and the push-sequence value for the first queue, if the sequence number of the first data packet on the second queue is not within a predetermined range of the push-sequence value for the second queue, the next acknowledgement number is determined to exist on the first queue, and the next acknowledgement number is greater than the push-sequence value for the second queue, generate the gap packet to have a starting sequence number equal to the push-sequence value for the second queue, an acknowledgement number equal to the determined ending sequence number, and a length equal to a difference between the next acknowledgement number and the push-sequence value for the second queue, and, if the sequence number of the first data packet on the second queue is not within a predetermined range of the push-sequence value for the second queue and either the next acknowledgement number is not determined to exist on the first queue or the next acknowledgement number is not greater than the push-sequence value for the second queue, generate the gap packet to have a starting sequence number equal to the push-sequence value for the second queue, an acknowledgement number equal to the determined ending sequence number, and a length equal to zero;

if the second queue is empty and the acknowledgement number of the first data packet on the first queue is greater than the push-sequence value for the second queue, generate the gap packet to have a starting sequence number equal to the push-value sequence for the second queue, an acknowledgement number equal to the push-sequence value for the first queue, and a length equal to a difference between the acknowledgement number of the first data packet on the first queue and the push-sequence value for the second queue; and, if the second queue is empty and the acknowledgement number of the first data packet on the first queue is not greater than the push-sequence value for the second queue, determine whether or not a next acknowledgement number in a data packet exists on the first queue that is greater than a preceding acknowledgement number in a preceding data packet on the first queue, wherein the preceding acknowledgement number is greater than the push-sequence value for the second queue, determine an ending sequence number for a last contiguous data packet on the first queue that comprises the acknowledgement number of the first data packet on the first queue, if the next acknowledgement number is determined to exist, generate the gap packet to have a starting sequence number equal to the push-sequence value for the second queue, an acknowledgement number equal to the determined ending sequence number, and a length equal to a difference between the next acknowledgement number and the push-sequence value for the second queue, and, if the next acknowledgement number is not determined to exist, generate the gap packet to have a starting sequence number equal to the push-sequence value for the second queue, an acknowledgement number equal to the determined ending sequence number, and a length equal to zero.

10. The method of claim 8, wherein maintaining the push-sequence values for the two queues comprises initializing the push-sequence values when the push-sequence value for one queue is outside a predetermined range from the acknowledgement value of a first data packet on the other one of the two queues.

11. The method of claim 10, wherein initializing the push-sequence values comprises:
identifying a first one of the two queues whose first data packet has an earlier timestamp than the first data packet on a second one of the two queues;
setting the push-sequence value for the first queue to the sequence number of the first data packet on the first queue; and
setting the push-sequence value for the second queue to the acknowledgement number of the first data packet on the first queue.

12. The method of claim 8, wherein the forcing condition comprises an elapse of a predetermined time during which no new data packets have been received from the network tap.

13. The method of claim 8, wherein the forcing condition comprises a number of data packets on one or both of the two queues exceeding a predetermined threshold.

14. The method of claim 8, wherein the forcing condition comprises a detection that the network connection between the two network agents has been closed.

15. A non-transitory computer-readable medium having instructions stored thereon, wherein the instructions, when executed by a processor, cause the processor to:
receive a plurality of data packets from a network tap on a network connection between two network agents, wherein each of the plurality of data packets comprise a starting sequence number and an acknowledgement number;
separate the plurality of data packets into two queues based on a direction of communication for each data packet, wherein each of the two queues represents a different direction of communication;
for each of the two queues, maintain a push-sequence value for the queue, wherein each push-sequence value represents a starting sequence number of a packet that must be pushed off its respective queue next in order to maintain a consecutive sequence number order for packets pushed off its respective queue;
when both of the push-sequence values are equal to the starting sequence number of a first data packet on their respective queues,
if the acknowledgement number of the first data packet on one of the two queues is greater than the push-sequence value for the other of the two queues and the acknowledgement number of the first data packet on the other queue is less than or equal to the push-sequence value for the one queue, push, to an output, an amount of data off of the other queue that is equal to a minimum of a length of the first data packet on the other queue and a difference between the acknowledgement number of the first data packet on the one queue and the push-sequence value for the other queue, and, otherwise,
  identify a first one of the two queues whose first data packet has an earlier timestamp than the first data packet on a second one of the two queues,
  determine whether or not a next acknowledgement number in a data packet exists on the second queue that is greater than a preceding acknowledgement number in a preceding data packet on the second queue, wherein the preceding acknowledgement number is greater than the push-sequence value for the first queue,
  if the next acknowledgement number is determined to exist on the second queue, push, to the output, an amount of data off of the first queue that is equal to the difference between the next acknowledgement number and the push-sequence value for the first queue,
  if the next acknowledgement number is not determined to exist on the second queue, push, to the output, the first data packet on the first queue, and
  provide the output to an application layer; and
when at least one of the push-sequence values is not equal to the starting sequence number of the first data packet on its respective queue and a forcing condition is met, generate at least one gap packet for at least one of the two queues.

16. The non-transitory computer-readable medium of claim 15, wherein generating at least one gap packet comprises, when the push-sequence value for a first one of the two queues is equal to the starting sequence number of a first data packet on the first queue and the push-sequence value for a second one of the two queues is not equal to the starting sequence number of a first data packet on the second queue:
  if the second queue is not empty and the acknowledgement number of the first data packet on the first queue is greater than the push-sequence value for the second queue, generate the gap packet to have a starting sequence number equal to the push-sequence value for the second queue, an acknowledgement number equal to the push-sequence value of the first queue, and a length equal to a minimum of a difference between a starting sequence number of the first data packet on the second queue and the push-sequence value for the second queue and a difference between the acknowledgement number of the first data packet on the first queue and the push-sequence value for the second queue;
  if the second queue is not empty and the acknowledgement number of the first data packet on the first queue is not greater than the push-sequence value for the second queue,
    determine whether or not a next acknowledgement number in a data packet exists on the first queue that is greater than a preceding acknowledgement number in a preceding data packet on the first queue, wherein the preceding acknowledgement number is greater than the push-sequence value for the second queue,
    determine an ending sequence number for a last contiguous data packet on the first queue that comprises the acknowledgement number of the first data packet on the first queue,
    if the sequence number of the first data packet on the second queue is within a predetermined range of the push-sequence value for the second queue, the next acknowledgement number is determined to exist on the first queue, the next acknowledgement number is greater than the push-sequence value for the second queue, and the next acknowledgement number is less than the sequence number of the first data packet on the second queue, generate the gap packet to have a starting sequence number equal to the push-sequence value for the second queue, an acknowledgement number equal to the determined ending sequence number, and a length equal to a difference between the next acknowledgement number and the push-sequence value for the first queue,
    if the sequence number of the first data packet on the second queue is within a predetermined range of the push-sequence value for the second queue and either the next acknowledgement number is not determined to exist on the first queue, the next acknowledgement number is not greater than the push-sequence value for the second queue, or the next acknowledgement number is not less than the sequence number of the first data packet on the second queue, generate the gap packet to have a starting sequence number equal to the push-sequence value for the second queue, an acknowledgement number equal to the determined ending sequence number, and a length equal to a difference between the sequence number of the first data packet on the second queue and the push-sequence value for the first queue,
    if the sequence number of the first data packet on the second queue is not within a predetermined range of the push-sequence value for the second queue, the next acknowledgement number is determined to exist on the first queue, and the next acknowledgement number is greater than the push-sequence value for the second queue, generate the gap packet to have a starting sequence number equal to the push-sequence value for the second queue, an acknowledgement number equal to the determined ending sequence number, and a length equal to a difference between the next acknowledgement number and the push-sequence value for the second queue, and,
    if the sequence number of the first data packet on the second queue is not within a predetermined range of the push-sequence value for the second queue and either the next acknowledgement number is not determined to exist on the first queue or the next acknowledgement number is not greater than the push-sequence value for the second queue, generate the gap packet to have a starting sequence number equal to the push-sequence value for the second queue, an acknowledgement number equal to the determined ending sequence number, and a length equal to zero;
  if the second queue is empty and the acknowledgement number of the first data packet on the first queue is greater than the push-sequence value for the second queue, generate the gap packet to have a starting sequence number equal to the push-value sequence for the second queue, an acknowledgement number equal to the push-sequence value for the first queue, and a length equal to a difference between the acknowledgement number of the first data packet on the first queue and the push-sequence value for the second queue; and,
  if the second queue is empty and the acknowledgement number of the first data packet on the first queue is not greater than the push-sequence value for the second queue,
    determine whether or not a next acknowledgement number in a data packet exists on the first queue that is greater than a preceding acknowledgement number in a preceding data packet on the first queue, wherein the preceding acknowledgement number is greater than the push-sequence value for the second queue, determine an ending sequence number for a last contiguous data packet on the first queue that comprises the acknowledgement number of the first data packet on the first queue, if the next acknowledgement number is determined to exist, generate the gap packet to have a starting sequence number equal to the push-sequence value for the second queue, an acknowledgement number equal to the determined ending sequence number, and a length equal to a difference between the next acknowledgement number and the push-sequence value for the second queue, and, if the next acknowledgement number is not determined to exist, generate the gap packet to have a starting sequence number equal to the push-sequence value for the second queue, an acknowledgement number equal to the determined ending sequence number, and a length equal to zero.

17. The non-transitory computer-readable medium of claim 15, wherein maintaining the push-sequence values for the two queues comprises initializing the push-sequence values when the push-sequence value for one queue is outside a predetermined range from the acknowledgement value of a first data packet on the other one of the two queues.

18. The non-transitory computer-readable medium of claim 17, wherein initializing the push-sequence values comprises:

identifying a first one of the two queues whose first data packet has an earlier timestamp than the first data packet on a second one of the two queues;

setting the push-sequence value for the first queue to the sequence number of the first data packet on the first queue; and setting the push-sequence value for the second queue to the acknowledgement number of the first data packet on the first queue.

19. The non-transitory computer-readable medium of claim 15, wherein the forcing condition comprises an elapse of a predetermined time during which no new data packets have been received from the network tap.

20. The non-transitory computer-readable medium of claim 15, wherein the forcing condition comprises a number of data packets on one or both of the two queues exceeding a predetermined threshold.

* * * * *